United States Patent
Kondo et al.

(10) Patent No.: US 6,289,134 B1
(45) Date of Patent: *Sep. 11, 2001

(54) IMAGE READ METHOD AND APPARATUS FOR OPTIMIZING SHADING CONDITIONS

(75) Inventors: Kazuyuki Kondo, Kawasaki; Kazuhiko Matsuoka, Yokohama, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,302

(22) Filed: Dec. 22, 1997

(30) Foreign Application Priority Data

Dec. 26, 1996 (JP) .................................................. 8-347916

(51) Int. Cl.[7] ........................................................ G06K 9/40
(52) U.S. Cl. ............................................. 382/274; 358/461
(58) Field of Search ................................. 358/406, 461, 358/448, 468, 471, 474, 487; 382/254, 274

(56) References Cited

U.S. PATENT DOCUMENTS

| 4,614,976 | * | 9/1986 | Ogata ................................. 358/406 |
| 4,680,644 | | 7/1987 | Shirato et al. . |
| 5,805,196 | * | 9/1998 | Nakanishi et al. .................. 347/230 |

FOREIGN PATENT DOCUMENTS

| 0 434 449 A2 | 6/1991 | (EP) . |
| 0 447 871 A2 | 9/1991 | (EP) . |

* cited by examiner

Primary Examiner—Thomas D. Lee
(74) Attorney, Agent, or Firm—Morgan & Finnegan, LLP

(57) ABSTRACT

In an image read apparatus which reads an image from a recording medium, such as a film, and outputs image data, and shading correction data is set. Time elapsed since the shading correction data is set is counted. Before performing main scanning, whether or not the elapsed time is longer than a predetermined period is determined, and if it is, the shading correction data is updated. The read image data is processed with shading correction using the shading correction data which is updated as time elapses.

20 Claims, 30 Drawing Sheets

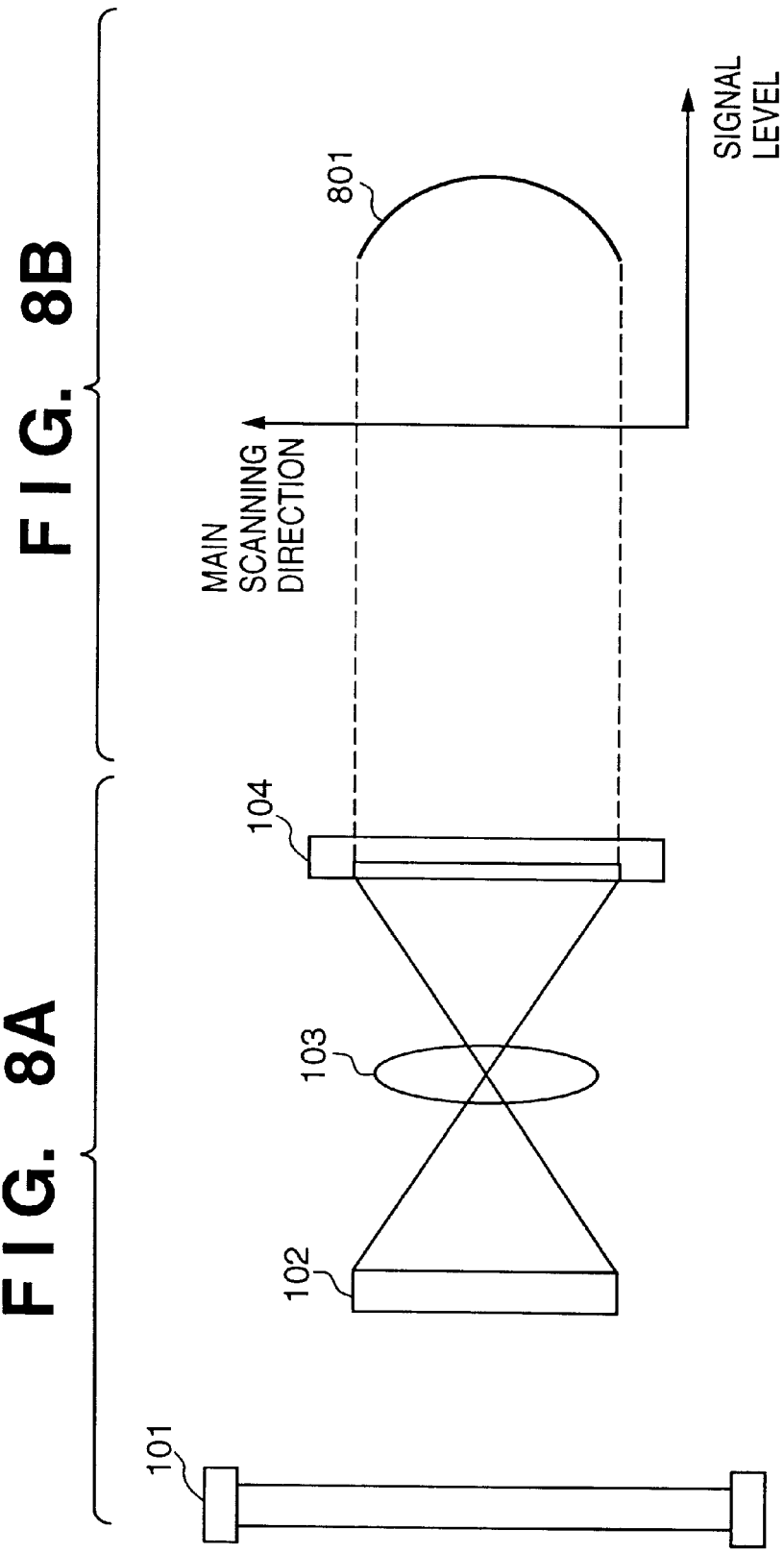

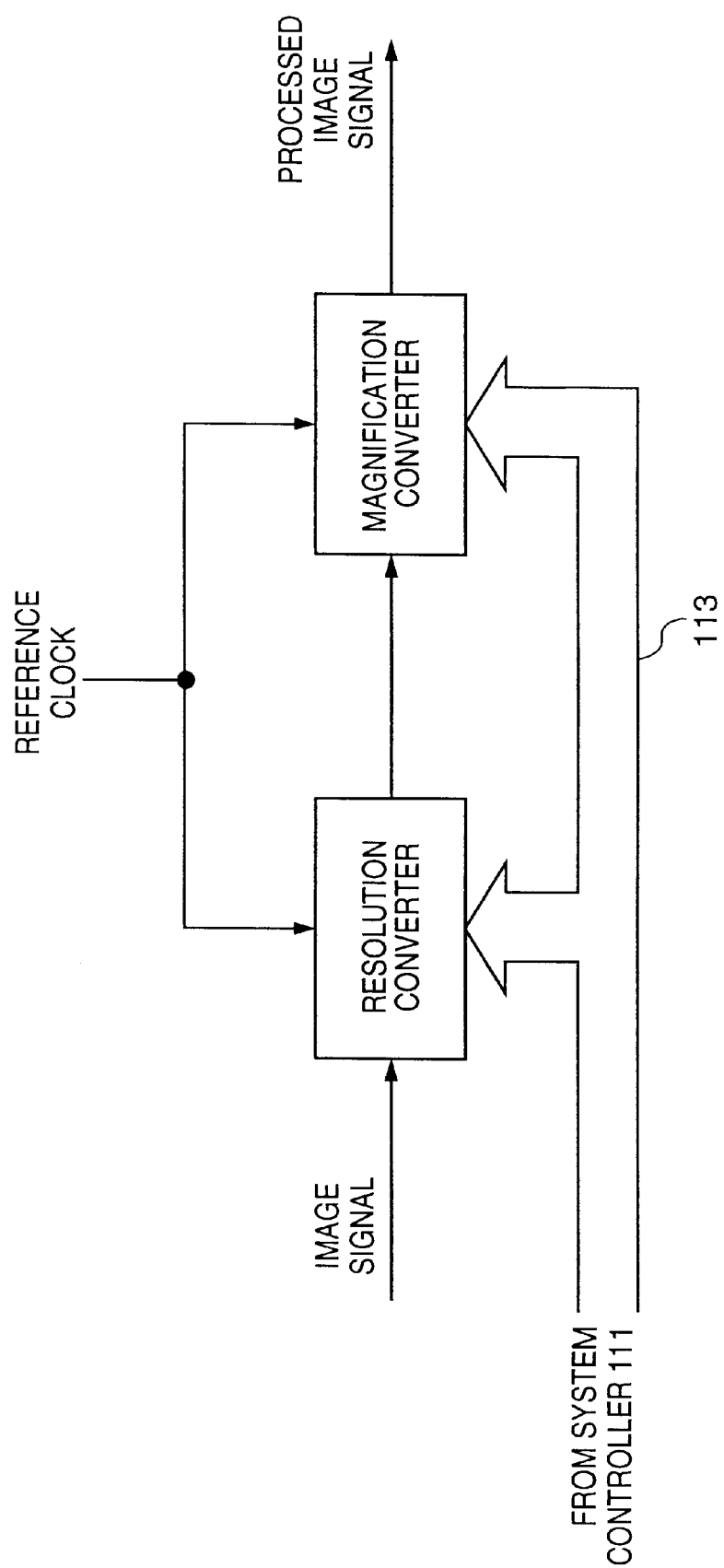

ORIGINAL IMAGE

OUTPUT IMAGE

ORIGINAL IMAGE

OUTPUT IMAGE

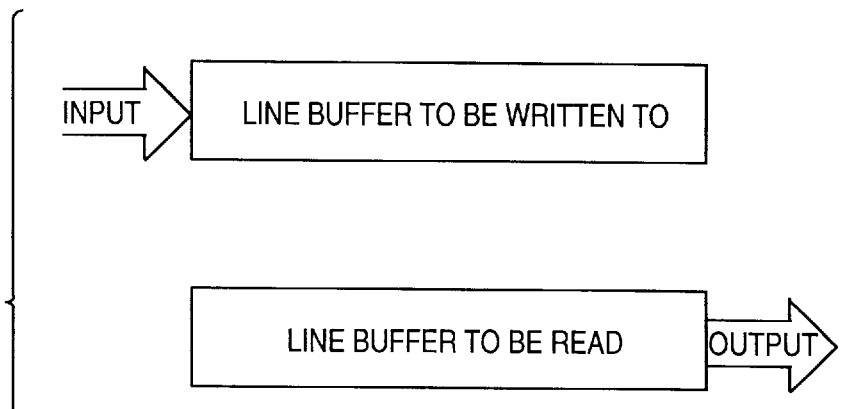
F I G. 20A
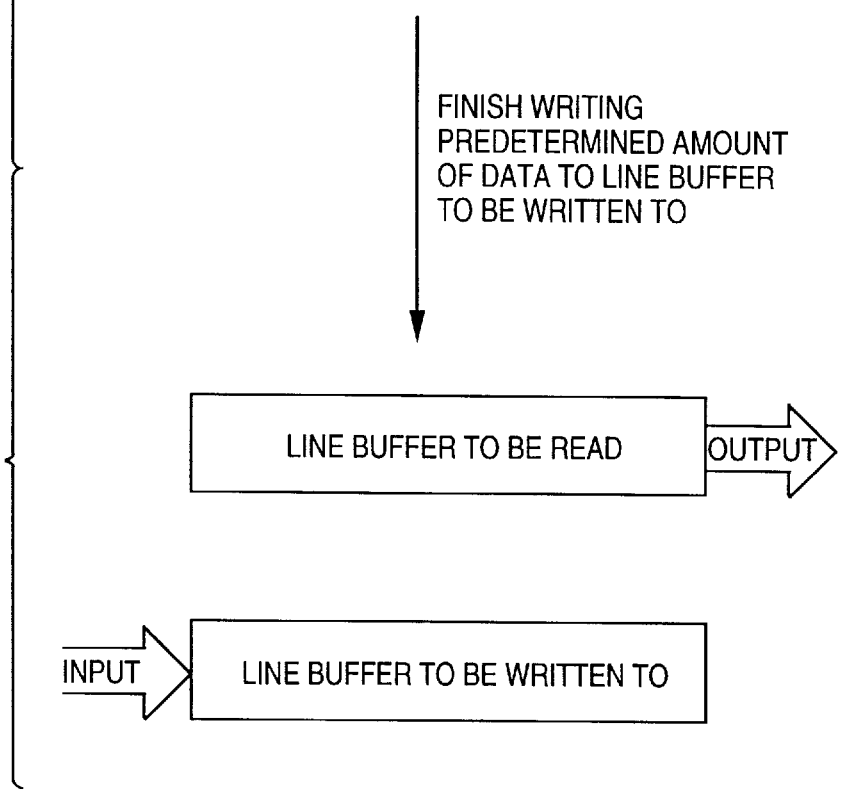
F I G. 20B

IMAGE READ METHOD AND APPARATUS FOR OPTIMIZING SHADING CONDITIONS

BACKGROUND OF THE INVENTION

The present invention relates to an image read method and apparatus and, more particularly, to an image read method for performing image processes complying with change in shading, and image read apparatus adopting the method.

A film scanner is known as an embodiment of an image processing apparatus for inputting an image recorded on a film to a device, such as a personal computer, which displays the inputted image. A film scanner has been developed for a 135 (35 mm) film. When reading an image, the film scanner first scans an image in a low resolution at high speed, and after the scanned image is displayed by the personal computer (this processing is called "previewing" and the displayed image is called "preview image" hereinafter), an area of the image to be read in a high resolution (main scan area) is designated on the preview image. Then, image data, read in the high resolution, of the image in the designated main scan area is transmitted from the film scanner to the personal computer.

FIG. 30 is a block diagram illustrating a configuration of a conventional film scanner 3000.

In FIG. 30, reference numeral 2801 is a light source; and 2802, a film holder for holding a film as a transparent original image. The film holder 2802 is configured movable in the Y direction. Further, reference numeral 2803 denotes a lens system; and 2804 a CCD linear image sensor (referred to as "CCD" hereinafter), provided in such a manner that the long side of the CCD 2804 is in the Z direction. In this arrangement, the main scanning direction, namely the long-side direction of the CCD 2804, and the sub-scanning direction, which is the moving direction of the film holder 2802, are orthogonal. Here, following combinations between the light source 2801 and the CCD 2804 are available for reading a color image. Namely,

| | Light Source | CCD Type | How to read |
|---|---|---|---|
| (1) | White | 3 lines | Output R, G and B signals simultaneously |
| (2) | Three colors (R, G, B) | 1 line | Output R, G and B signals in time division |
| (3) | White (R, G, B filters) | 1 line | Output R, G and B signals in time division |

The respective combinations have different features and defects, and applications of these combination are often determined by trial and error means. Here, the combination (1) is applied as an example.

Reference numeral 2805 denotes an analog image processing unit where setting of gain and clamping is performed on an analog image signal outputted from the CCD 2804; 2806, an analog-digital (A/D) converter for converting an analog image signal into a digital image signal; 2807, an image processing unit, configured with a gate array, capable of applying various image processes to the digital image signal at high speed and outputting a CCD driving pulse; 2808, a line buffer for temporarily storing image data; 2809, an interface (I/F) ifor communicating with an external device 2810, such as a personal computer; 2811, a system controller, storing program for controlling overall operation in the film scanner 3000, for performing various operation in response to instructions from the external device 2810; 2812, a system bus, configured with an address bus and a data bus, for connecting the system controller 2811, the image processing unit 2807, the line buffer 2808, and the I/F 2809; 2813, a sub-scanning motor, a stepping motor, for moving the film holder 2802 in the sub-scanning direction; 2814, a sub-scanning motor driver for driving the sub-scanning motor 2813 in response to instructions from the system controller 2811; 2815, a sub-scanning position detector for detecting the reference position of the film holder 2802 in the sub-scanning direction by detecting the position of the protuberant shape (not shown) of the film holder 2802 using a photo-interrupter; and 2816, a light-source on/off circuit for turning on and off the light source 2801.

The conventional film scanner 3000 is configured as above, and the film scanner 3000 and the external device 2810, such as a personal computer, communicates by executing software (called "firmware" hereinafter) stored in the system controller 2811 and software (driver software) for controlling the film scanner 3000 by the external device 2810, and image data read by the film scanner 3000 is transmitted to the external device 2810.

FIG. 31 is a flowchart showing an operational sequence of the film scanner 3000 and the external device 2810. Here, it is assumed that both the film scanner 3000 and the external device 2810 are already turned on, the firmware and the driver software are initiated, and the film is already set at a predetermined position.

First in step S2901, previewing is designated by a user through the external device 2810. Upon designating previewing, the external device 2810 transmits various control information, such as type of film, area to be read, and resolution to be used, to the system controller 2811. In the previewing processing, the area to be read is an entire image recorded on the film, and the resolution is set low.

Next, the system controller 2811 prepares for the previewing by setting the information provided in step S2901 from the external device 2810 in step S2902. Thereafter, the process proceeds to step S2903 where the system controller 2811 receives information from the sub-scanning position detector 2815 and controls the sub-scanning motor 2813 so that the film holder 2802 is moved to a predetermined initial position (referred to as "sub-scanning initial position" hereinafter).

Then, in step S2904, the system controller 2811 issues an instruction to turn on the light source 2801 to the light-source on/off circuit 2816, thereby the light source 2801 is turned on. In the succeeding step S2905, the system controller 2811 issues an instruction to output timing signals, such as a CCD driving pulse for reading one line of an image and a RAM address control signal.

Next in step S2906, the image is read line by line by exposing the CCD 2804 for a predetermined period of time while driving the sub-scanning motor 2813 at a predetermined speed. Thereafter, predetermined image processes are performed on the read image data by the image processing unit 2807, and the image data is transmitted to the external device 2810.

After finishing scanning of the designated area of the image in step S2907, the system controller 2811 drives the sub-scanning motor 2813 so as to move the film holder 2802 back to the sub-scanning initial position, and turns off the light source 2801. As soon as all the image data is outputted, the system controller 2811 controls to stop respective functions.

Next, in step S2908, the system controller 2811 is in stand-by state until a next command is received.

In turn, in step S2909, the external device 2810 receives the image data and sequentially displays it on its display screen, thereby providing a preview image to a user.

The process proceeds to step S2910 where the user sets image read (scanning) conditions while watching the preview image on the display screen. Here, similarly to a case where the previewing was designated in step S2901, various information, such as type of the film, area to be read, and resolution to be used, are transmitted to the system controller 2811. Note, in this case, the information for main scanning operation, namely, area to be read designated by the user, and resolution to be used also designated by the user, and so on, are transmitted to the system controller 2811.

In turn, the system controller 2811 receives the image read conditions from the external device 2810 and performs the main scanning under the received image read conditions in step S2911 by repeating the processes in steps S2902 to S2908 as described above.

Thereafter, image data which is transmitted to the external device 2810 is displayed on its display screen as well as stored in a predetermined storage medium (e.g., hard disk, magneto-optical disk, and floppy disk) in step S2912, thereby the entire operation is completed.

However, in the aforesaid conventional film scanner, the user normally does not take a film out of the film scanner until the entire operation is completed; therefore, shading correction data which is taken when performing initialization has to be used until the film is taken out from the film scanner. However, in a case where the film scanner reads images recorded on a single film for long time, the states of the light source changes due to, e.g., change in environmental temperature and change in voltage of electric power supplied to the light source. As a result, in the conventional image scanner, an optimized shading correction is not always performed, which causes deterioration of image quality.

SUMMARY OF THE INVENTION

The present invention has been made in consideration of the above situation, and has as its object to provide an image read method and an image read apparatus which minimize deterioration of image quality due to shading which change as time elapses.

According to the present invention, the foregoing object is attained by providing an image read method characterized by comprising: an image read step of reading an image from a recording medium and outputting image data; a setting step of setting shading correction data; a time counting step of counting elapsed time from a predetermined time; an updating step of updating the shading correction data when the elapsed time counted in the time counting step is longer than a predetermined period of time; and an image processing step of performing image process on the image data obtained in the image read step using the shading correction data.

Further, the object is also attained by providing a control method for controlling an image read apparatus, characterized by comprising: a time counting step of counting elapsed time from a predetermined time; and a designating step of designating to update shading correction data when the elapsed time counted in the time counting step is longer than a predetermined period of time.

Furthermore, the foregoing object is also attained by providing an image read apparatus comprising: image read means for reading an image from a recording medium and outputting image data; setting means for setting shading correction data; storage means for storing the shading correction data set by the setting means; time counting means for counting elapsed time from a predetermined time; control means for controlling the setting means to update the shading correction data when the elapsed time counted by the time counting means is longer than a predetermined period of time; and image processing means for performing image process on the image data obtained by the image read means using the shading correction data stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A and 8B are views for explaining shading;

FIG. 12 is a block diagram illustrating an internal configuration of a resolution/magnification converter;

FIGS. 20A and 20B are conceptual views of a line buffer;

DETAILED DESCRIPTION OF THE PREFERRED EMBODIMENTS

Preferred embodiments of the present invention will be described in detail in accordance with the accompanying drawings.

In the following embodiments, a film scanner capable of reading both a 135 (35 mm) film and an APS™ (advanced photo system) film is explained as an example of the present invention. However, the present invention is applicable to any image read apparatus capable of reading a transparent original image. Further, it is also possible to apply the present invention to a reflecting image read apparatus for reading an image by detecting reflected light from the image.

<First Embodiment>

Figure 1:
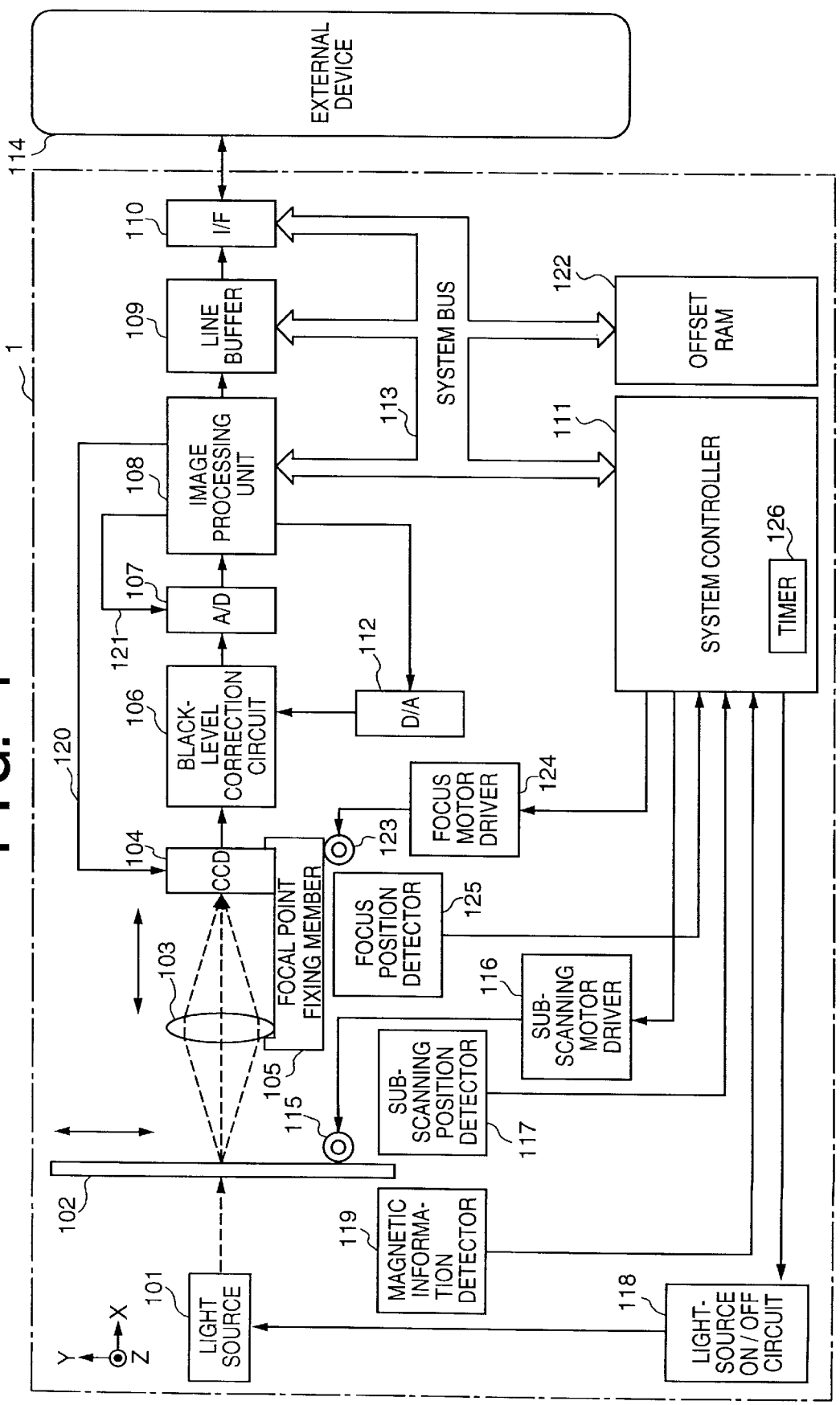
FIG. 1 is a block diagram illustrating a configuration of a film scanner according to a first embodiment of the present invention.

FIG. 1 is a block diagram illustrating a configuration of a film scanner 1 according to a first embodiment of the present invention. In FIG. 1, reference numeral 101 denotes a light source having a cold-cathode tube; 102, an APS™ film (referred to as "film" hereinafter) as a transparent original image, provided movable in the Y direction; 103, an optical system composed of a plurality of lenses; and 104, a linear image sensor, basically constituted with CCD, (referred to as "CCD 104" hereinafter) and provided in such a manner that the long side of the CCD 104 is in the Z direction. In this arrangement, the main scanning direction, namely the long-side direction of the CCD 104, and the sub-scanning direction, which is the moving direction of the film 102, are orthogonal.

Reference numeral 105 denotes a focal point fixing member for holding the CCD 104 near the image plane of the optical system 103, and the CCD 104 and the optical system 103 are integrally moved back and forth along the optical axis, namely, in the X direction.

Further, reference numeral 106 denotes a black level correction circuit for adjusting the black level of the analog image signal outputted from the CCD 104; 107, an analog-digital (A/D) converter for converting the analog image signal whose black level is corrected into a digital image signal; and 108, an image processing unit for performing predetermined image processing (will be explained later) at high speed and providing a pulse used for operating the CCD 104. The image processing unit 108 is configured with a gate array, and capable of performing various image processes at high speed. Further, reference numeral 109 denotes a line buffer, constituted with a general-purpose random access memory, for temporarily storing the image data; and 110, an interface (I/F) for communicating with an external device 114, such as a personal computer.

Furthermore, reference numeral 111 denotes a system controller storing an overall operational sequence of the film scanner 1, and controls various operations of each units in response to instructions from the external device 114; and 113, a system bus, which is configured with an address bus and a data bus, for connecting the system controller 111, the image processing unit 108, the line buffer 109, the I/F 110, and an offset RAM 122 which will be explained later.

Reference numeral 115 denotes a sub-scanning motor, a stepping motor, here, for moving the film 102 in the sub-scanning direction; 116, a sub-scanning motor driver for driving the sub-scanning motor 115 in response to instructions from the system controller 111; and 117, a sub-scanning position detector for detecting the reference position of the film 102 in the sub-scanning direction by detecting the positions of perforations of the film 102 using a photo-interrupter.

Reference numeral 118 denotes a light-source on/off circuit, an inverter circuit, for turning on and off the light source 101; 119, a magnetic information detector, e.g., a magnetic reproducing head, for reading magnetic information recorded on the film 102; 120, a pulse used for driving the CCD 104; and 121, a sample-and-hold (S/H) control signal for sampling and holding the input image signal.

Reference numeral 122 denotes a RAM, called "offset RAM", used as a working area when performing image processes. The offset RAM 122 temporarily stores various data used for shading correction, γ correction and color data line matching, and image data. The detail will be explained later. Reference numeral 123 denotes a focus motor for moving the focal point fixing member 105 in the direction of the optical axis; 124, a focus motor driver for providing a driving signal to the focus motor 123; and 125, a focus position detector for detecting an initial position of the focal point fixing member 105.

Figure 2:
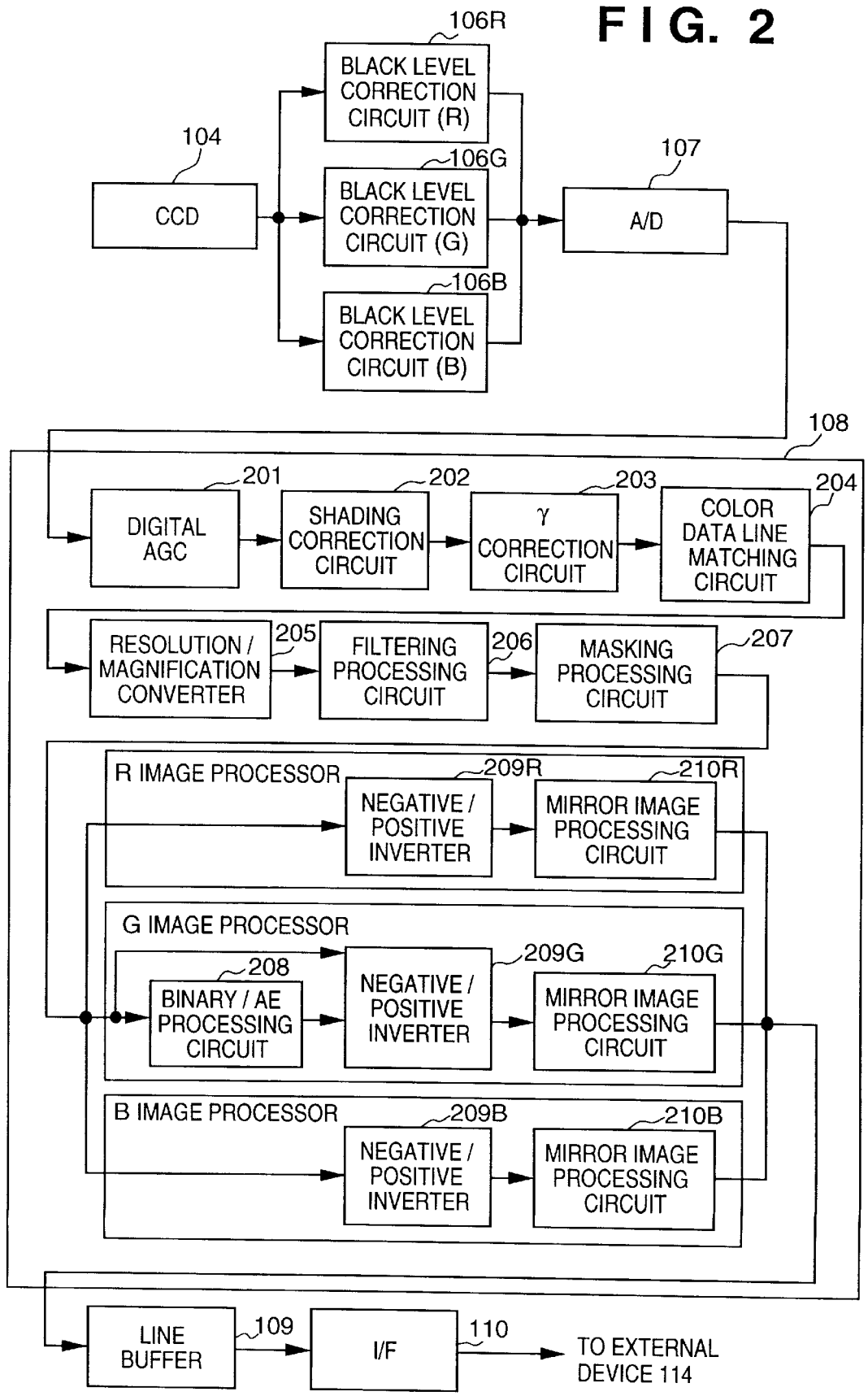
FIG. 2 is a block diagram illustrating a configuration of a portion relating to image processes.
Figure 3:
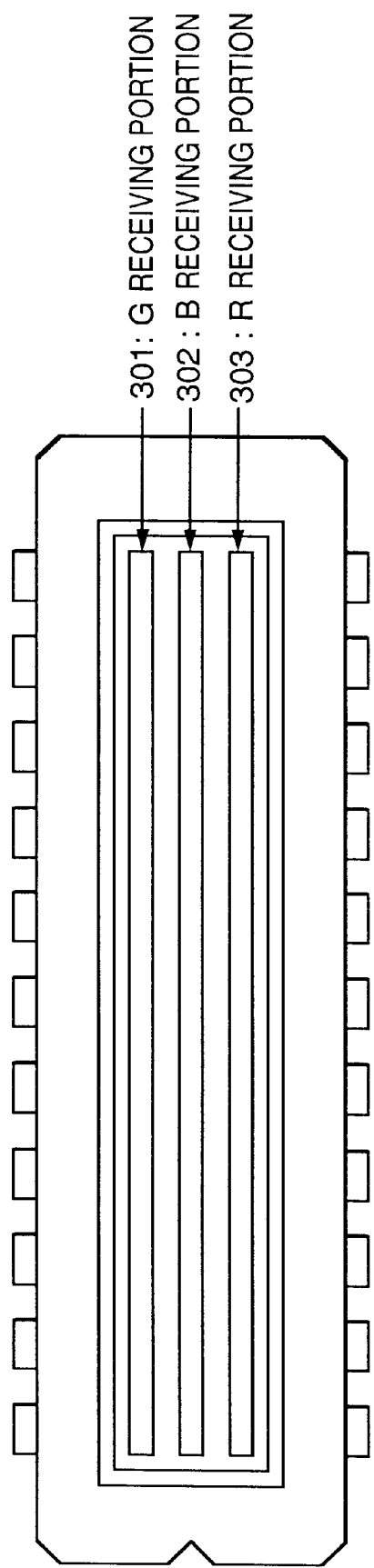
FIG. 3 is an explanatory view of a photo-sensing surface of a CCD.

Next, a portion relating to image processes is explained in detail with referring to FIG. 2. In FIG. 2, reference numeral 104 denotes the CCD, having three lines of linear sensors, and its photo-sensing surface is as shown in FIG. 3.

The CCD 104 is an one-chip photoelectric converting element including a green light (G) receiving portion 301, a blue light (B) receiving portion 302, and a red light (R) receiving portion 303, arranged in parallel separated at a predetermined distance from each other, and a circuit for driving itself. More specifically, in the CCD 104, each of the G receiving portion 301, the B receiving portion 302, and R receiving portion 303 is constituted with several thousands of photo-reception elements of several-micrometer square.

Figure 4:
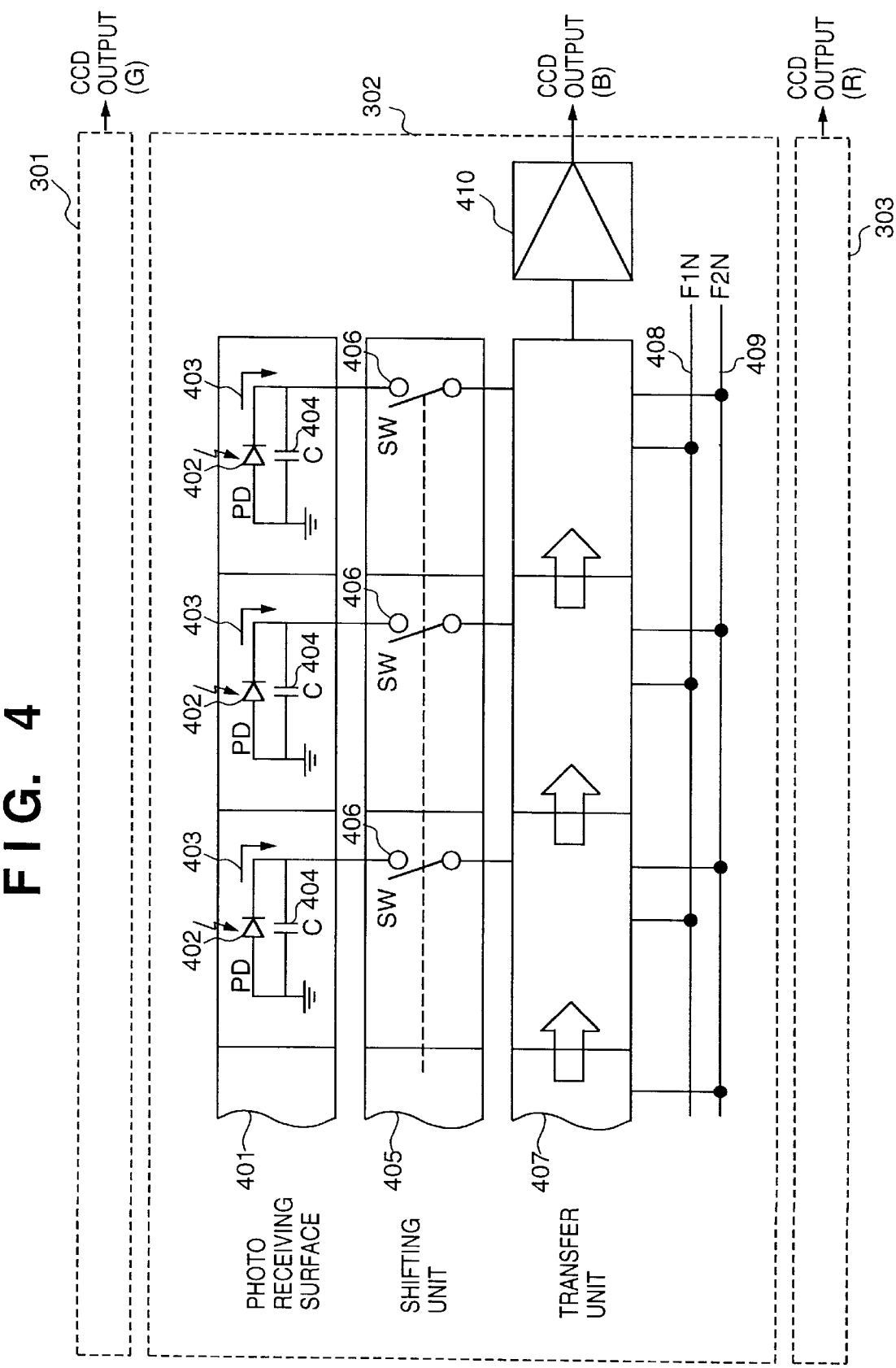
FIG. 4 is a diagram illustrating a detailed configuration of a blue light photo receiving portion of the CCD shown in FIG. 3.

FIG. 4 is a diagram illustrating a detailed configuration of the B photo receiving portion 302 of the CCD 104. Since the configurations of the G and R photo receiving portions 301 and 303 are the same as that of the B photo receiving portion 302, explanation of them is omitted.

In the B photo receiving portion 302, when light incidents on a photo receiving surface 401 of the CCD 104, charges proportional to the quantity of light are generated by photodiodes 402 and current flows in the direction of an arrow 403. Thereby, in condensers 404, the charges corresponding to the quantity of light are stored. The charges stored in the condensers 404 are simultaneously transmitted to a transfer unit 407 by simultaneously closing all switches (SW) 406 in a shifting unit 405. Thereafter, the charges transferred to the transfer unit 407 are further transferred in the main scanning direction in synchronization with CCD operation signals 408 and 409 having different phases. Further, the transferred charges are converted into voltage signals by the amplifier 410, and outputted. Note, the control signal for controlling the switches 406, and CCD operation signals 408 and 409 are generated on the basis of the driving pulse 120, shown in FIG. 1, which is outputted by the image processing unit 108 at a predetermined timing.

The black level of the output signal from the CCD 104 is not sufficiently stabilized if amplified only by the amplifier 410. Therefore, the black level correction circuit 106 adjusts the output from the CCD 104 and fixes the black level of image data so that the maximum voltage of a signal inputted to the A/D converter 107 is 5V.

Figure 5:
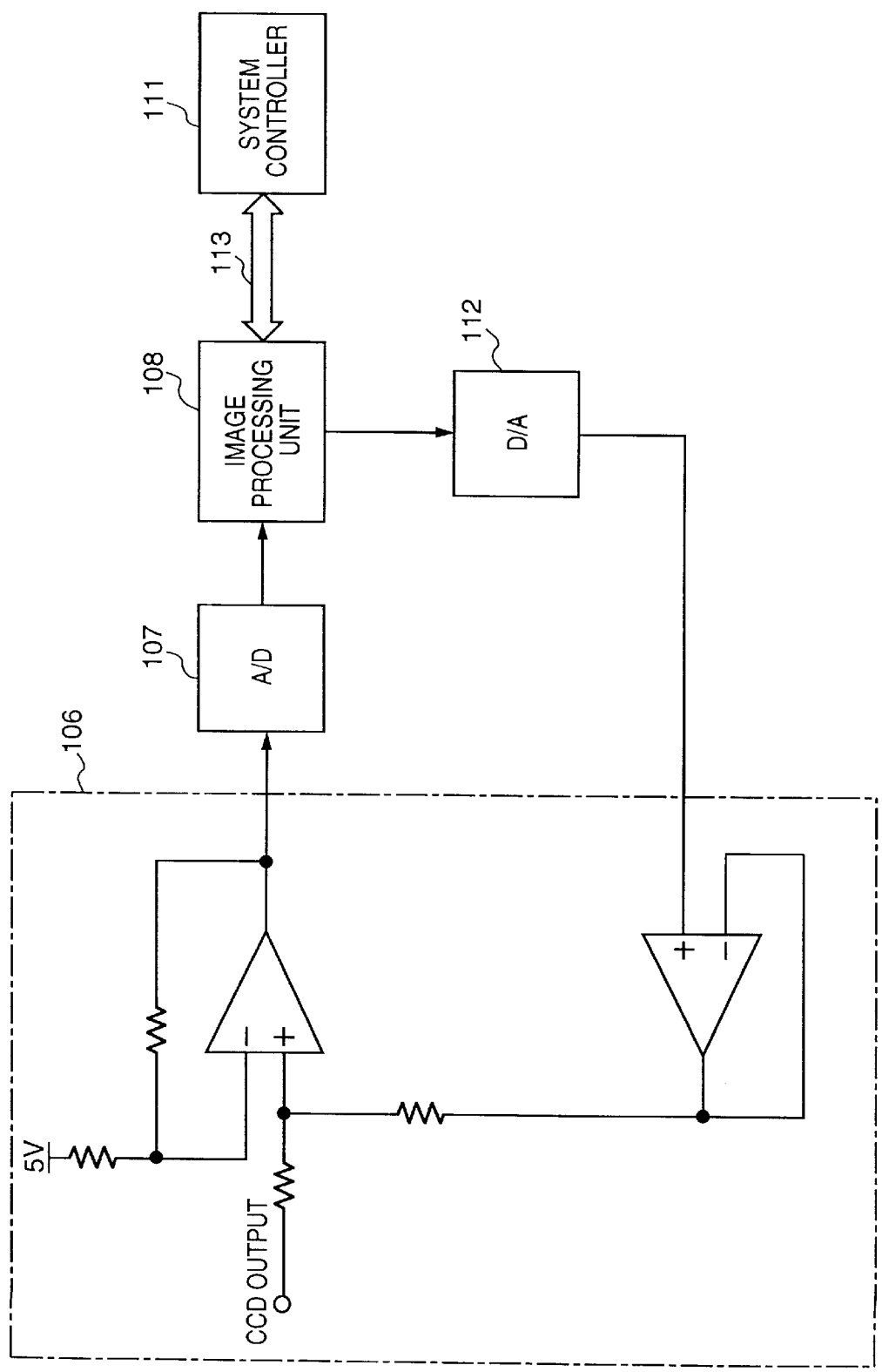
FIG. 5 is a circuit diagram of a black level correction circuit and its peripheral units.

FIG. 5 is a circuit diagram of the black level correction circuit 106 and its peripheral units. The CPU of the system controller 111 regularly checks the voltage applied to the A/D converter 107 via the system bus 38. Then, when the voltage which is equal or higher than 5V is applied to the A/D converter 107, the system controller 111 generates data which reduces the voltage of the input image signal to a voltage less than 5V, on the basis of the image data which is analog-digital converted by the A/D converter 107. Thereafter, the generated data is converted into an analog electric signal by the D/A converter 112 and added to the image signal. By lowering the voltage applied to the A/D converter 107, as described above, black level is stabilized. Note, the aforesaid black level correction is performed for each of R, G and B signals in parallel.

Figure 6:
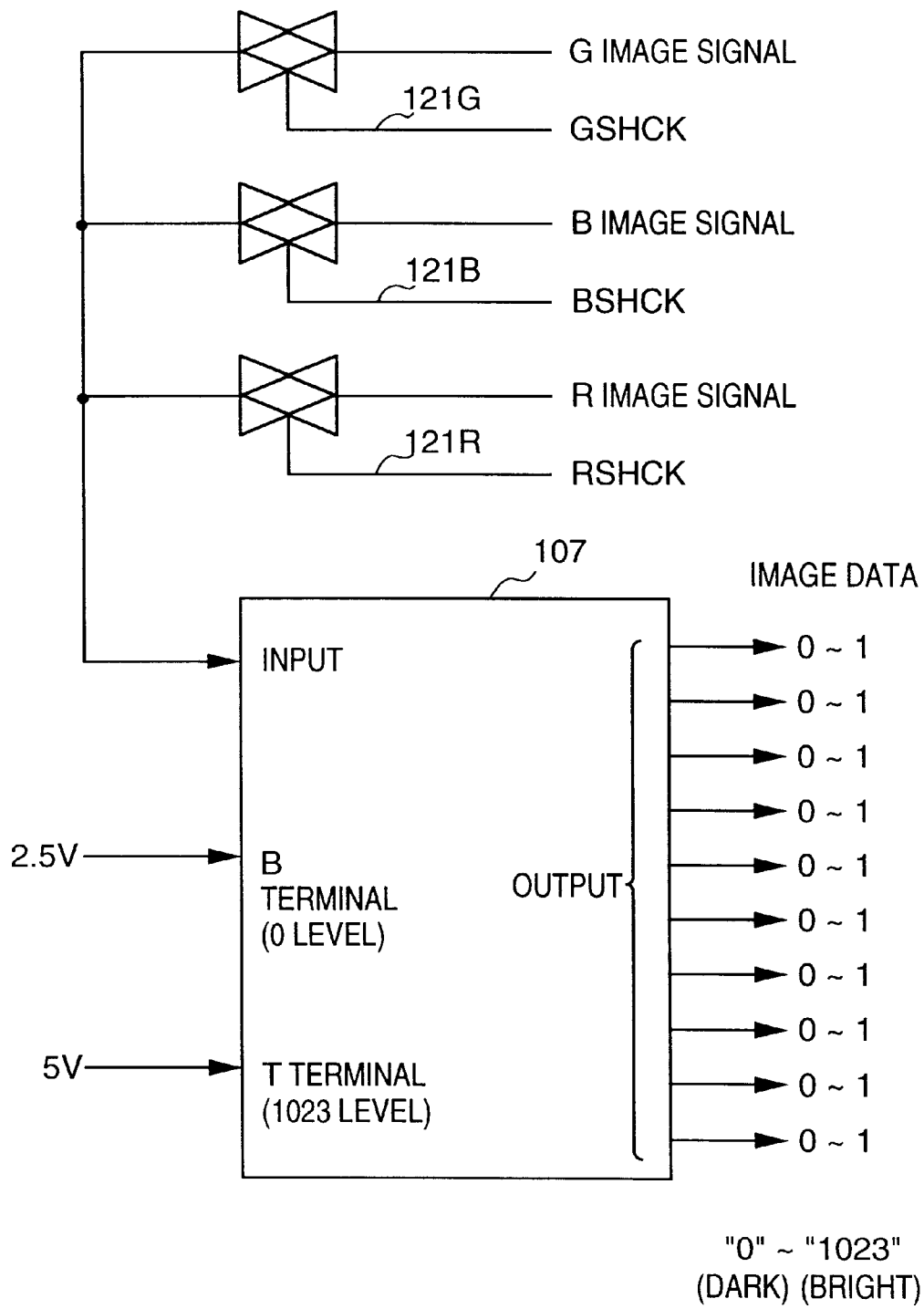
FIG. 6 is a diagram for explaining an operation of an A/D converter.

The image signal (analog signal) applied with black level correction is converted into a digital signal by the A/D converter 107. FIG. 6 is a diagram for explaining an operation of the A/D converter 107. Referring to FIG. 6, sample-and-hold signals (GSHCK, BSHCK, RSHCK) 121G, 121B and 121R for respective colors are provided from the image processing unit 108 to the A/D converter 107, and analog image signals are converted to ten-bit digital image signals by the A/D converter 107 in the order of G image signal, B image signal and R image signal, in accordance with the sample-and-hold signals 121G, 121B and 121R. More specifically, 5V is applied to a T terminal of the A/D converter 107 and a reference voltage (here, 2.5V) is applied to a B terminal. Then, the A/D converter 107 outputs, for example, "0" from all the output terminals ("0" as an image signal level) when an inputted analog electric image signal is 5V, whereas outputs "1" from all the output terminals (namely, "1023" as an image signal level) when the inputted analog electric image signal is the reference voltage (2.5V).

Figure 7A:
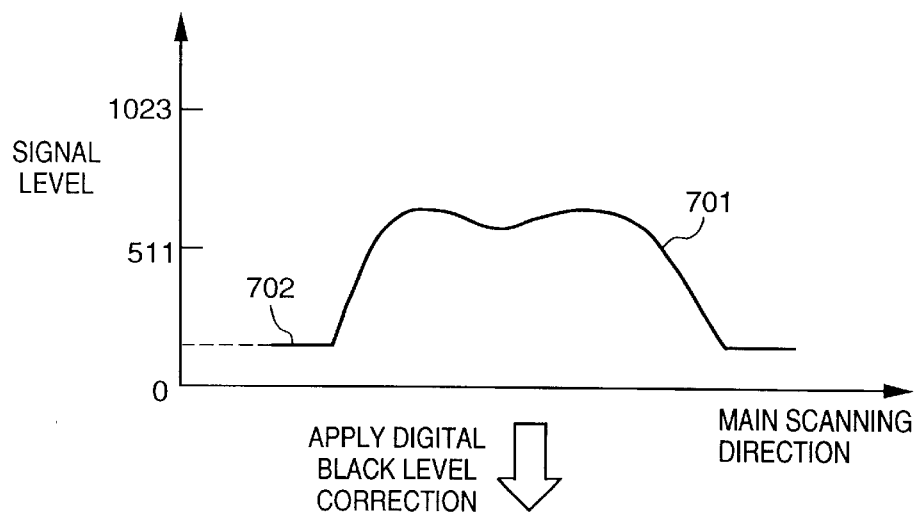
FIGS. 7A to 7C are graphs for showing how an image signal level changes while being processed by a digital automatic gain controller.
Figure 7B:
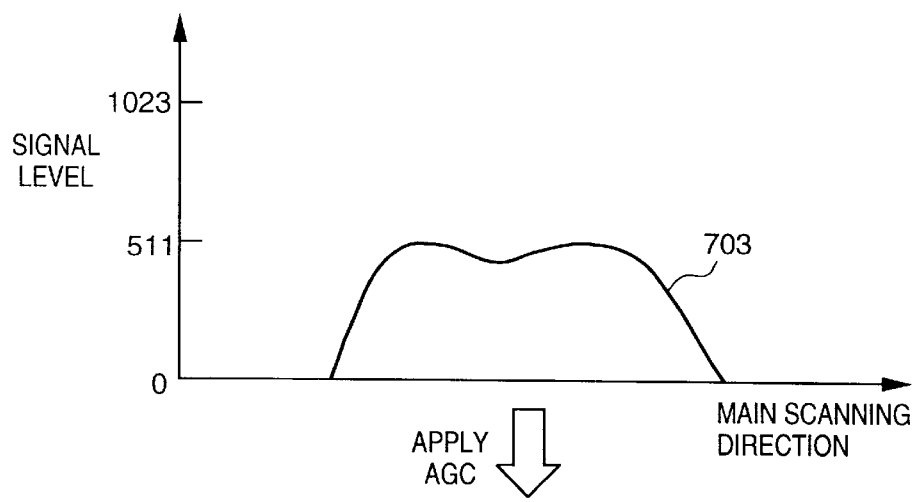
Figure 7C:
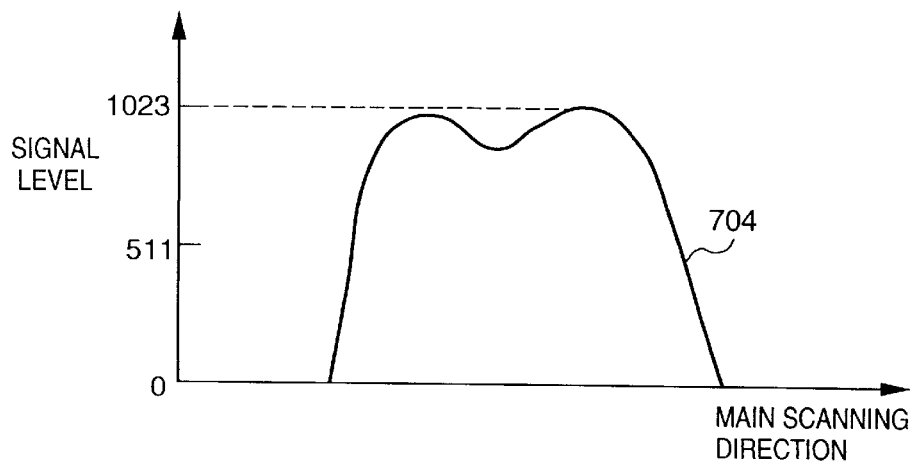

The electric image signal outputted from the A/D converter 107 is processed as follows in the image processing unit 108. Reference numeral 201 denotes a digital automatic gain controller (AGC), which adjusts the signal level of image data (image signal level) of each color as shown in FIGS. 7A to 7C. First, after the black level of image data is stabilized by the black level correction circuits 106R, 106G and 106B, the image data is further applied with digital black level correction. This digital black level correction is realized by subtracting the value of a pixel corresponding to an optically black level in the CCD output, indicated by reference numeral 702 in FIG. 7A, from the overall image data indicated by reference numeral 701. Reference numeral 703 in FIG. 7B denotes image data after performed with digital black level correction. Further, the image data of each color is independently amplified by a value between one and two, thereby balance of the signal level of each color is adjusted. The curve 704 in FIG. 7C is an example of the signal level of one color, and obtained by amplifying the image data 703 so that the maximum value of the image data 703 becomes "1023".

Reference numeral 202 in FIG. 2 denotes a shading correction circuit. As shown in FIGS. 8A and 8B, the distribution of signal levels of image data in the main scanning direction is not always uniform as shown by a curve 801 when there is no film. This is because, a. Quantity of light from the light source 101 is higher in the central portion than in edge portions, b. Quantity of light transmitted through the lens system 103 is higher in the central portion than in edge portion, and c. Sensitivity of each of photo-receiving elements in the CCD 104 is not the same for all photo-sensing elements.

For the aforesaid reasons, the signal level of the output image signal would be as shown by a curve 801. Thus, shading correction is performed so as to compensate (equalize) the variation in distribution of image signals. In the first embodiment, before a film is set, distributions of light intensity in the main scanning direction are read by the respective G, B and R lines of the CCD 104 and temporarily stored in the offset RAM 122. Then, the system controller 111 compares the data stored in the offset RAM 122 with a reference density data of a white color, and stores difference between the reference density data and the data stored in the offset RAM 122 as shading correction data. This shading correction data is used for correcting image data when scanning a film.

Figure 10:
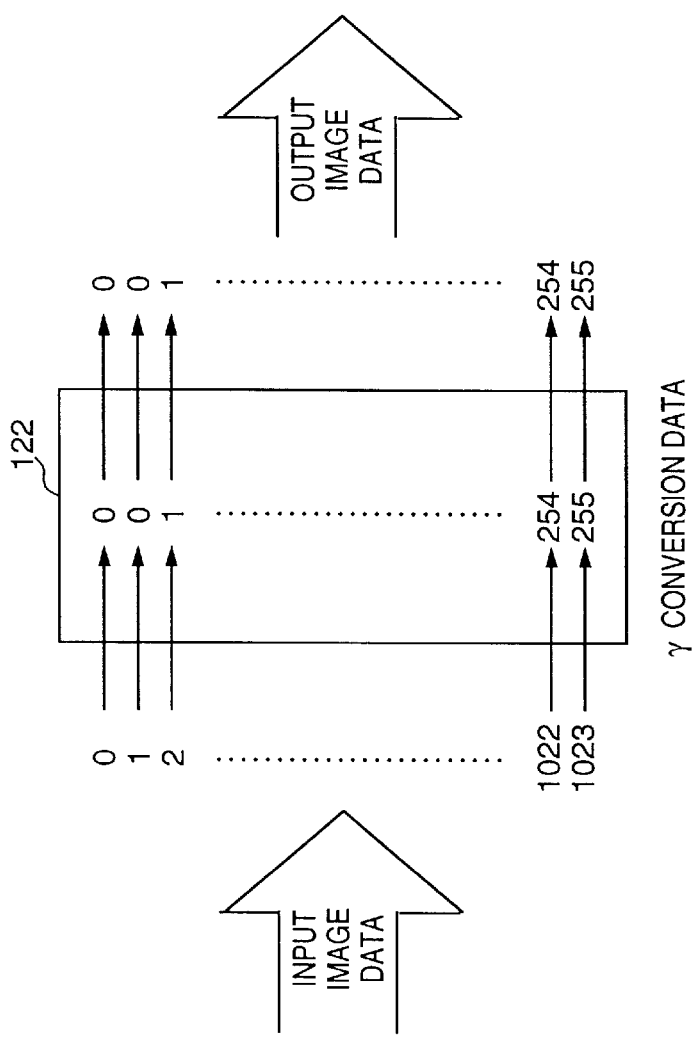
FIG. 10 is a view for explaining the γ correction.
Figure 9:
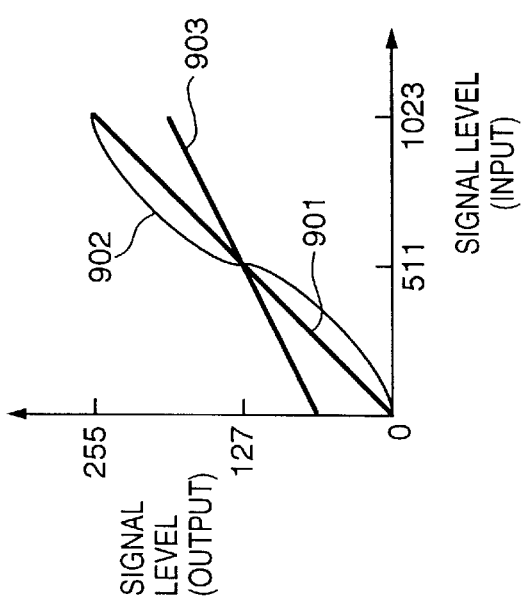
FIG. 9 is a graph for explaining γ correction.

Reference 203 in FIG. 2 denotes a γ correction circuit where contrast of the image is adjusted and the image signal which is represented as ten-bit image data is converted into eight-bit image data. FIG. 9 shows an example of a γ conversion data, and the abscissa shows signal level (0 to 1023) of input image data and the ordinate shows signal level (0 to 255) of output image data. A straight line 901 is called a "through pattern", and this converts ten-bit input image data into eight-bit output image without changing characteristics of the input image data. A curve 902 is called a "high contrast pattern", and this enhances differences in density of the image. Further, a straight line 903 is called a "low contrast pattern", and this reduces differences in density of an image. Upon executing the γ correction, a γ correction operation window is displayed on a display device (not show) connected to the external device 114, and the γ correction is performed on the basis of a γ pattern directly operated and set by a user on the displayed γ correction operation window. This γ conversion data is transmitted to the system controller 111 and stored in the offset RAM 122. By using the stored γ conversion data, input image data (10 bits) is converted into output image data (8 bits) as shown in FIG. 10.

Figure 11:
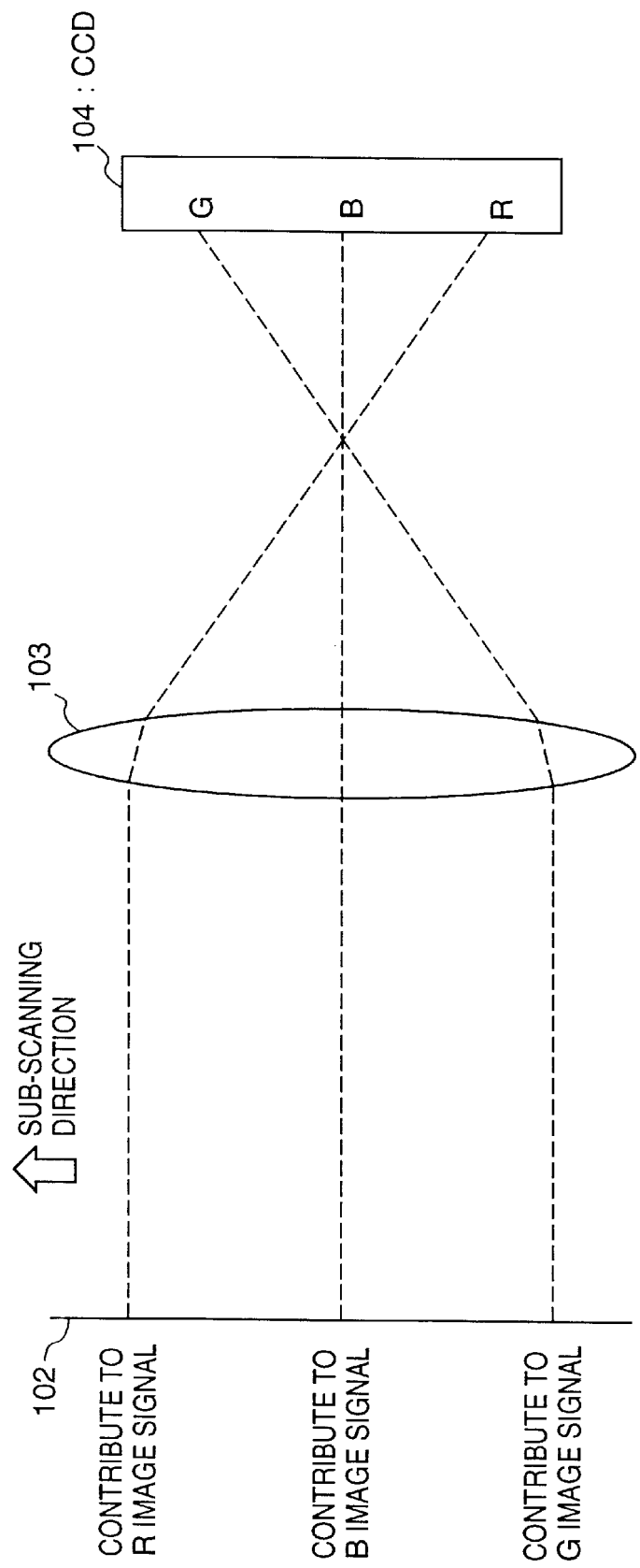
FIG. 11 is an explanatory view showing relationship between an arrangement of R, G and B lines of the CCD and portions of an image sensed by the R, G and B lines.

Reference numeral 204 in FIG. 2 denotes a color data line matching circuit where data taken from different positions of respective colors of the CCD 104 are compensated. More specifically, since three lines of photo-reception elements for obtaining R, G and B signals are arranged in parallel along the main scanning adirection, as shown in FIG. 11, R, G and B image data representing a single line can not be read simultaneously, and actually, R, G and B image data representing different three lines in an image is read simultaneously. Therefore, the color data line matching circuit 204 stores the R, G and B image data in the offset RAM 122, and, when all the R, G and B image data representing the same line are stored in the offset RAM 122, it outputs the stored R, G and B image data of a single line.

Figure 13A:
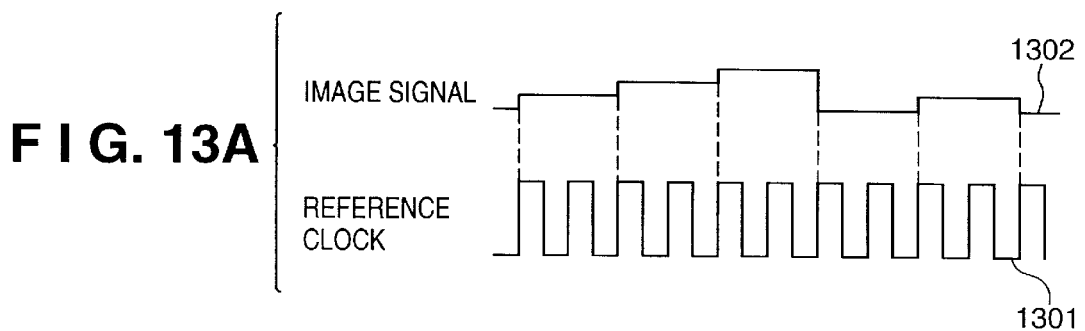
FIGS. 13A and 13B are timing diagrams showing clock signals generated by the resolution/magnification converter.

Reference numeral 205 in FIG. 2 denotes a resolution/magnification converter 205. FIG. 12 is a block diagram illustrating an internal configuration of the resolution/magnification converter 205. As shown in FIG. 12, the resolution/magnification converter 205 has a resolution converter which generates a clock for changing resolution (resolution conversion clock 1303) on the basis of a reference clock 1301 and processes an input image signal 1302 in accordance with the resolution conversion clock 1303 and a magnification converter which generates a clock (magnification conversion clock 1304) for triggering to take the image signed transmitted from the resolution converter to an input port (not shown), and outputs the image signal taken in accordance with the magnification conversion clock 1304. To the resolution converter and the magnification converter, conversion parameters generated by the system controller 111 are inputted via the system bus 113. The frequency of the reference clock 1301 is set twice higher than that of a clock used for operating the CCD 104. Therefore, the frequency of the reference clock 1301 is twice higher than that of the input image signal 1302, as shown in FIG. 13A.

Figure 13B:
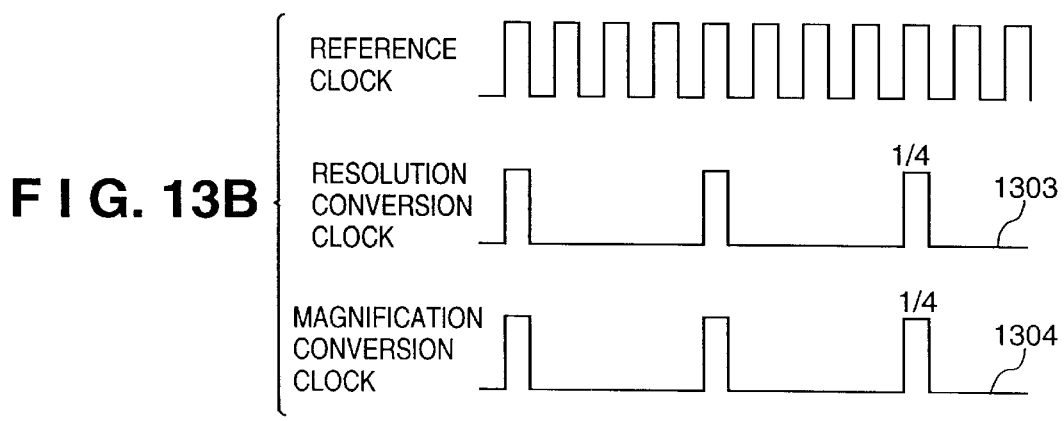

In a case where the resolution converter operates in accordance with the resolution conversion clock 1303 having a half frequency of that of the reference clock 1301 and the magnification converter operates in accordance with-the reference clock 1301, two image signals having identical information are outputted in series from the resolution/magnification converter 205 while each image signal 1302 is inputted. In this case, the resultant outputted image data represents an image having the resolution of the CCD 104 and enlarged by 200%. The above operation is based on an instruction to output an image in the same resolution as that of the CCD 104 with magnification of 200%. In a case where an instruction to output an image at half the resolution of the CCD 104 and with magnification of 50% in the main scanning direction is inputted, the resolution converter operates in accordance with the resolution conversion clock 1303 having a frequency of one-fourth of the reference clock 1301 as shown in FIG. 13B, thereby skipping one-half of the output signal from the CCD 104, Further, the magnification converter operates in accordance with the magnification conversion clock 1304 also having a frequency of one-fourth of the reference clock 1301.

Figure 14A:
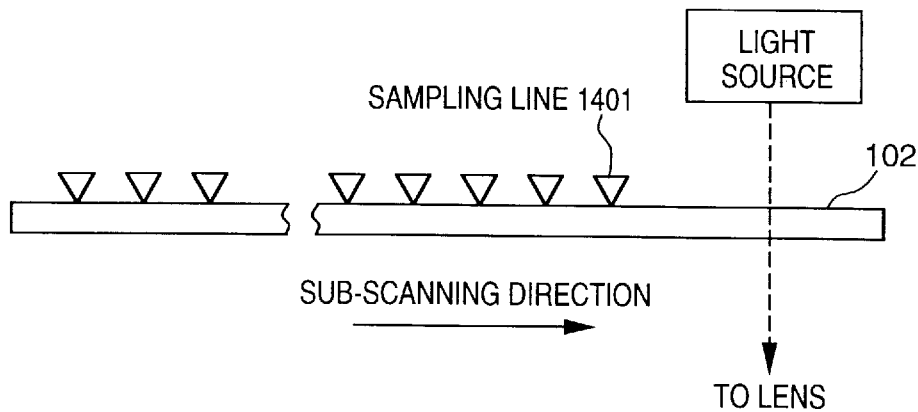
FIGS. 14A to 14C are diagrams for explaining resolution/magnification conversion in the sub-scanning direction.
Figure 14B:
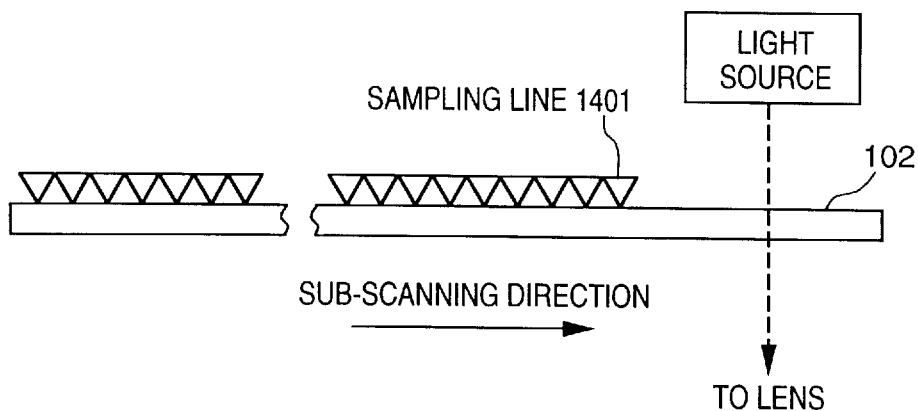
Figure 14C:
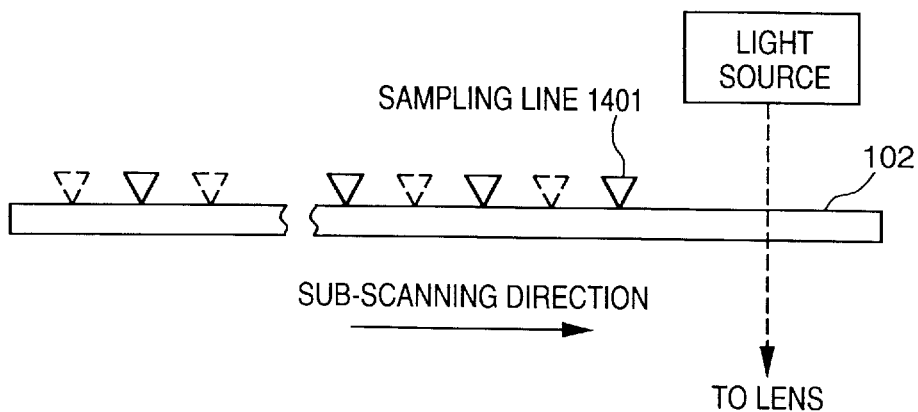

FIGS. 14A to 14C are diagrams for explaining resolution/magnification conversion in the sub-scanning direction.

In FIGS. 14A to 14C, reference numeral 1401 denotes sampling lines. FIG. 14A shows a case where the film 102 is moved at a predetermined reference speed in the sub-scanning direction. In order to increase the resolution or the size of an image, the number of the sampling lines is increased by conveying the film 102 at a lower speed than the reference speed in the sub-scanning direction, as shown in FIG. 14B, and the read data is written to the offset RAM 122. Whereas, in a case of decreasing the resolution or the size of an image, the film 47 is conveyed at the reference speed in the sub-scanning direction, however, part of the data read in the sampling lines 1401 is not written to the offset RAM 122, as shown in FIG. 14C. Of course, it is possible to carry the film 102 at a higher speed than the reference speed and write all the read data to the offset RAM 122.

Reference numeral 206 in FIG. 2 denotes a filtering processing circuit, where a filtering processing is performed so as to increase the quality of an image which is deteriorated by the resolution conversion or the magnification conversion performed by the resolution/magnification converter 205.

A following table 1 shows the contents of the filtering processing:

TABLE 1

| Tone | Resolution (dpi) | Interpolation Main | Interpolation Sub | Averaging | Smoothing | Edge Processing |
|---|---|---|---|---|---|---|
| 24 bits | 170–340 | X | O | O | X | X |
| 24 bits | 341–680 | X | O | O | X | X |
| 24 bits | 681–1360 | X | O | O | X | X |
| 24 bits | 1361–2719 | O | O | X | O | O |
| 24 bits | 2720 | X | X | X | X | X |
| 24 bits | 2720–5440 | O | X | X | O | O |
| 8 bits | 170–340 | X | O | O | X | X |
| 8 bits | 341–680 | X | O | O | X | X |
| 8 bits | 681–1360 | X | O | O | X | X |
| 8 bits | 1361–2719 | O | O | X | O | O |
| 8 bits | 2720 | X | X | X | X | X |
| 8 bits | 2720–5440 | O | X | X | O | O |
| Binary | 170–340 | X | O | O | X | O |
| Binary | 341–680 | X | O | O | X | O |
| Binary | 681–1360 | X | O | O | X | O |
| Binary | 1361–2719 | O | O | X | O | O |
| Binary | 2720 | X | X | X | X | X |
| Binary | 2720–5440 | O | X | X | O | O |

Note, in the table 1, "main" and "sub" indicate the main scanning direction and the sub-scanning direction, respectively. Further, "O" in the table 1 indicates "apply", and "X" in the table 1 indicates "not apply".

As shown in the table 1, various known filtering processing, such as interpolation in the main scanning direction and in the sub-scanning direction, averaging, smoothing, and edge processing, are selectively performed on the image signal in accordance with resolutions in the respective tones (24 bits, 8 bits, binary).

Figure 15:
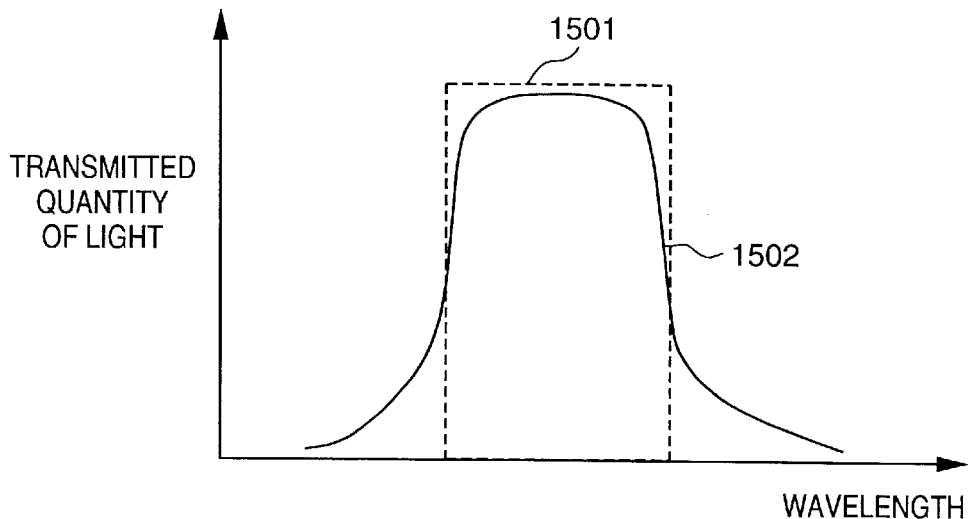
FIG. 15 is a graph showing a relationship between wavelength and quantity of light transmitted through a filter.
Figure 16:
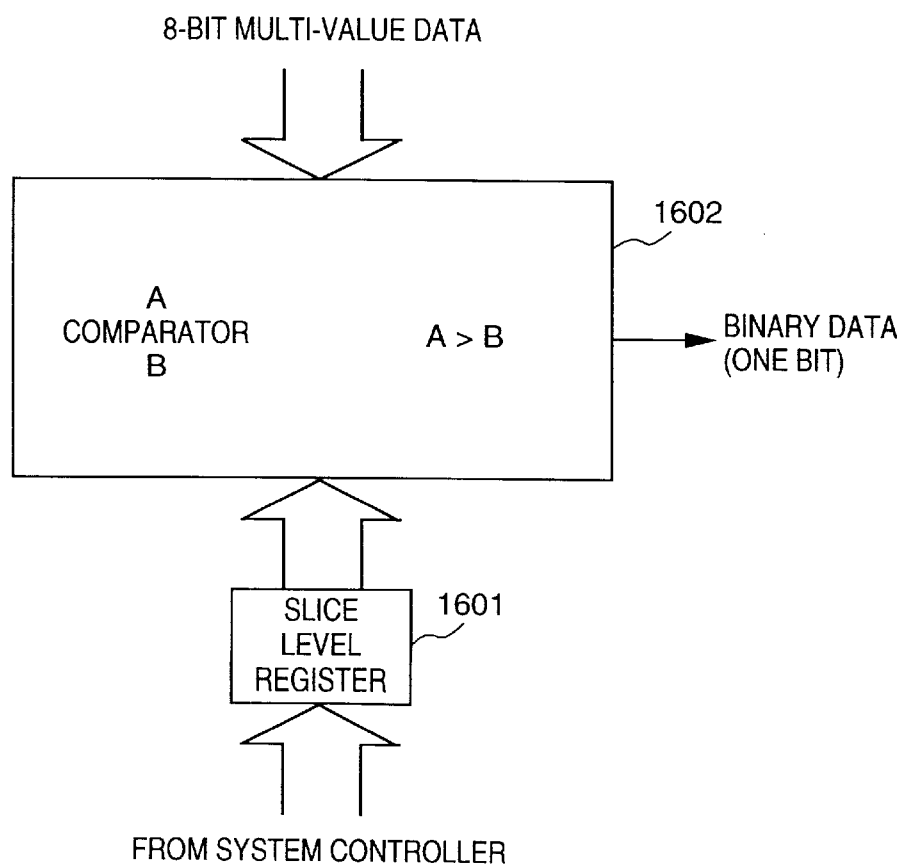
FIG. 16 is a view for explaining binarization.

Reference numeral 207 in FIG. 2 denotes a masking processing circuit where transmission characteristics of the R, G and B filters on the CCD 104 are corrected. Ideally, a color filter only transmits light whose wavelength is in a range shown by a dashed line 1501 and blocks light whose wavelength is outside of the range as shown in FIG. 15. In practice, however, the filter transmits light, as shown by a curve 1502, whose wavelength is outside of the ideal range referred by 1501. Accordingly, the masking processing circuit 207 corrects the actual characteristics of the color filters so as to approach the ideal characteristics by using the following equation (1);

$$\begin{pmatrix} Rout \\ Gout \\ Bout \end{pmatrix} = \begin{pmatrix} Rr & Gr & Br \\ Rg & Gg & Bg \\ Rb & Gb & Bb \end{pmatrix} \times \begin{pmatrix} Rin \\ Gin \\ Bin \end{pmatrix} \quad (1)$$

where Rout, Gout and Bout are signals outputted from the masking processing circuit 207; Rin, Gin and Bin are signals inputted to the masking processing circuit 207; and Rr, Gr, Br, Rg, Gg, Bg, Rb, Gb, and Bb are predetermined filtering correction coefficients.

Reference numeral 208 in FIG. 2 denotes a binarization/AE(automatic exposure) processing circuit which converts an 8-bit multi-value data into binary image data which represents either black or white using one bit. When the system controller 111 is instructed to perform binarization by the external device 114, the system controller 111 sets a parameter to the slice level register 1601. When the set parameter is defined by B and an 8-bit multi-value data by A, then the comparator 1602 compares the parameters A and B. If A is greater than B, binary data, "1", is outputted, whereas, if equal or less than the parameter B, binary data "0" is outputted. At the same time, when the density of the original image changes while scanning the film, the slice level is automatically changed, as an AE function, which enables the binarization/AE processing circuit 208 to output binary data of good reproductivity. Upon changing the slice level, the binarization/AE processing circuit 208 determines an optimized slice level by picking up a white peak value and a black peak value of each line while scanning the film and updates the contents of the slice level register.

Figure 17A:
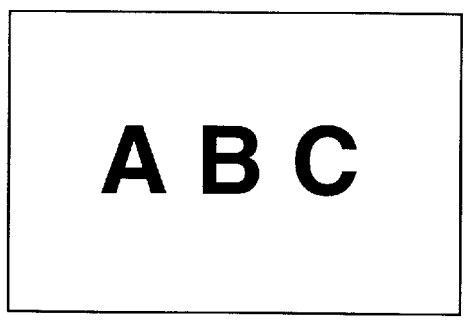
FIGS. 17A and 17B are explanatory views for explaining negative/positive inversion.
Figure 17B:
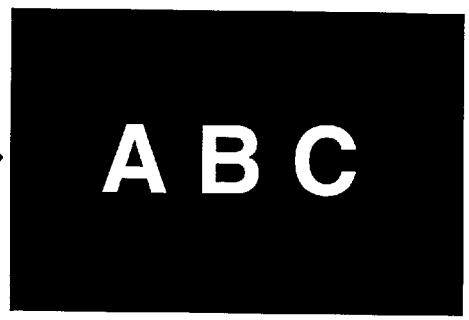
Figure 18:
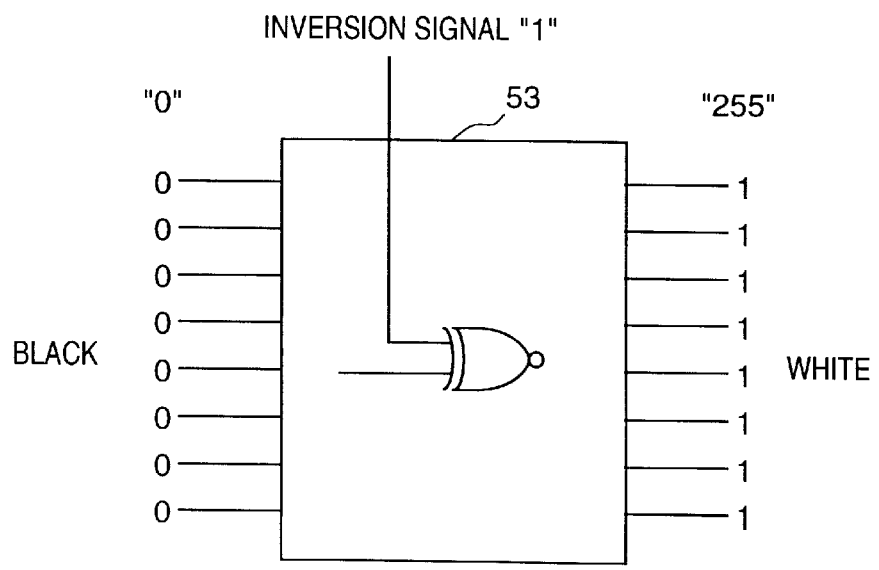
FIG. 18 is a diagram illustrating a brief configuration of a negative/positive inverter.

Reference numerals 209R, 209G and 209B denote negative/positive inverters which invert the density levels of image data of the original image as shown in FIGS. 17A and 17B. More specifically, each of the negative/positive inverters 209R, 209G and 209B has an exclusive NOR gate as shown in FIG. 18, and when the system controller 111 sets "1" which is an inversion signal, image data of each pixel is inverted.

Figure 19A:
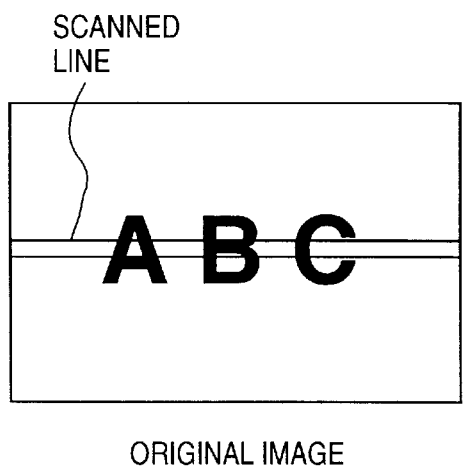
FIGS. 19A to 19C are explanatory views for explaining mirror image processing.
Figure 19B:
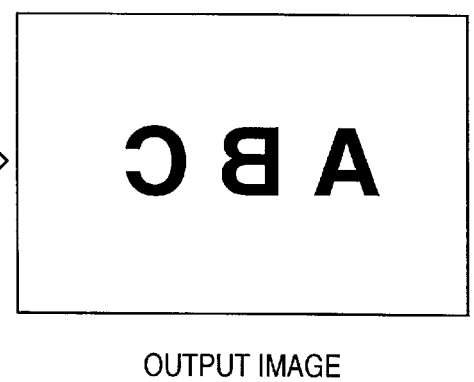
Figure 19C:
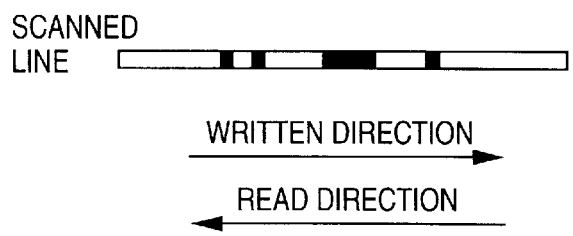

Reference numerals 210R, 210G and 210B denote mirror image processing circuits which rotates image data by 180° (mirror image) in the main scanning direction as shown in FIGS. 19A and 19B. This mirror image processing is realized by reading image data written in the line buffer 109 in the opposite direction to the write direction as shown in FIG. 19C.

Reference numeral 109 in FIG. 2 denotes a line buffer for temporarily storing the processed image data. The line buffer 109 is conceptually divided into two blocks for writing and reading, as shown in FIGS. 20A and 20B. While image data is written to one of the line buffers, image data is read from the other line buffer. When the line buffer which has been written to becomes full, then the line buffer for writing is changed to the line buffer for reading.

Reference numeral 110 denotes the I/F which is configured with a SCSI controller, for example.

Next, an operational sequence of the film scanner 1 configured as above will be explained.

Figure 21:
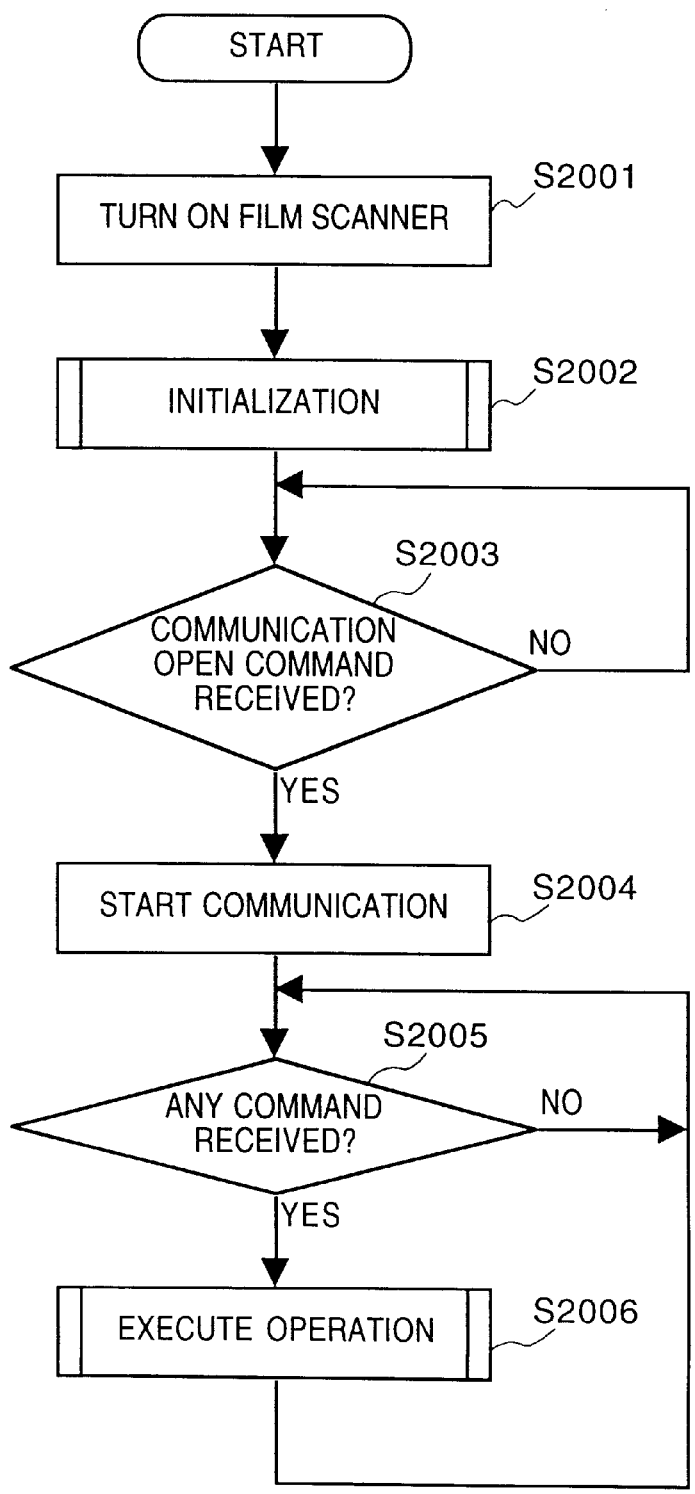
FIG. 21 is a flowchart showing a communication sequence in the film scanner when communicating with an external device according to the first embodiment of the present invention.
Figure 22:
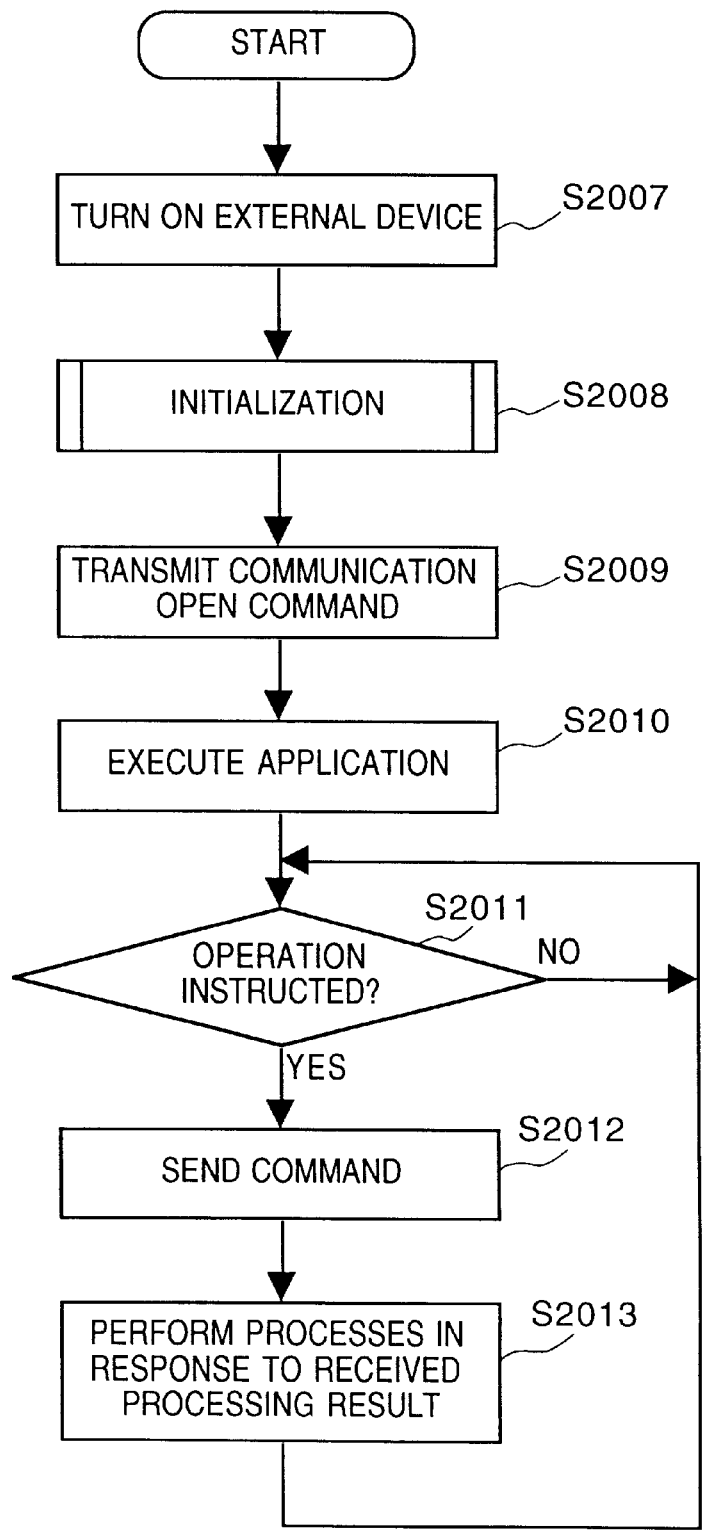
FIG. 22 is a flowchart showing a communication sequence in the external device when communicating with the film scanner according to the first embodiment of the present invention.

Communication sequences between the film scanner 1 and the external device 114 are shown in flowcharts in FIGS. 21 and 22.

More specifically, FIG. 21 is a flowchart showing a communication sequence in the film scanner 1 when communicating with the external device 114 according to the third embodiment of the present invention, and FIG. 22 is a flowchart showing a communication sequence in the external device when communicating with the film scanner 1. The processes shown in the flowcharts in FIGS. 21 and 22 are performed by CPU in the system controller 111 and CPU in the external device 114, respectively. Similarly, processes shown in flowcharts in FIG. 23 to 29, which will be explained later, are also performed by the CPUs in the system controller 111 and the external device 114.

After the film scanner 1 is turned on in step S2001, initialization, which will be explained later, is performed in step S2002.

Meanwhile, the external device 114 is turned on in step S2007, then initialization, such as memory check and SCSI check, is performed in step S2008.

In the film scanner 1, the process proceeds to step S2003 where whether or not a communication open command is received from the external device 114 is determined. If NO in step S2003, then the film scanner 1 goes to a stand-by state for waiting for a command, whereas if YES, then the process proceeds to step S2004.

The external device 114 transmits a communication open command requesting to open communication to the film scanner 1 in step S2009. In response to the communication open command, step S2003 becomes YES, thereby the process proceeds to step S2004 and the external device 114 can communicates with the film scanner 1.

In step S2004, the film scanner 1 starts communicating with the external device 114.

When the communication starts, the external device 114 executes an application software including driver software in step S2010.

In the proceeding step S2011, a user inputs an instruction for operating the film scanner 1. Note, the termination of the application is performed in response to a termination instruction by the user, and when the termination instruction is designated by the user, communication with the film scanner 1 is closed and the application is terminated.

In step S2012, the driver software generates a command corresponding to the operation instruction designated by the user, and sends the command to the film scanner 1.

Whereas, after the communication is opened in step S2004, the film scanner 1 waits for a command in step S2005. If no command is inputted, then the film scanner 1 repeats step S2005. Whereas if a command is inputted, then the process proceeds to step S2006.

In step S2006 the film scanner 1 executes an operation in response to the received command. Progress of the execution is informed to the external device 114 successively.

In turn, the external device 114 receives the information on the progress of the execution from the film scanner 1, and provides the information to the user in step S2013. Right after the processing corresponding to the designated command is completed, the process returns to step S2011.

Figure 23:
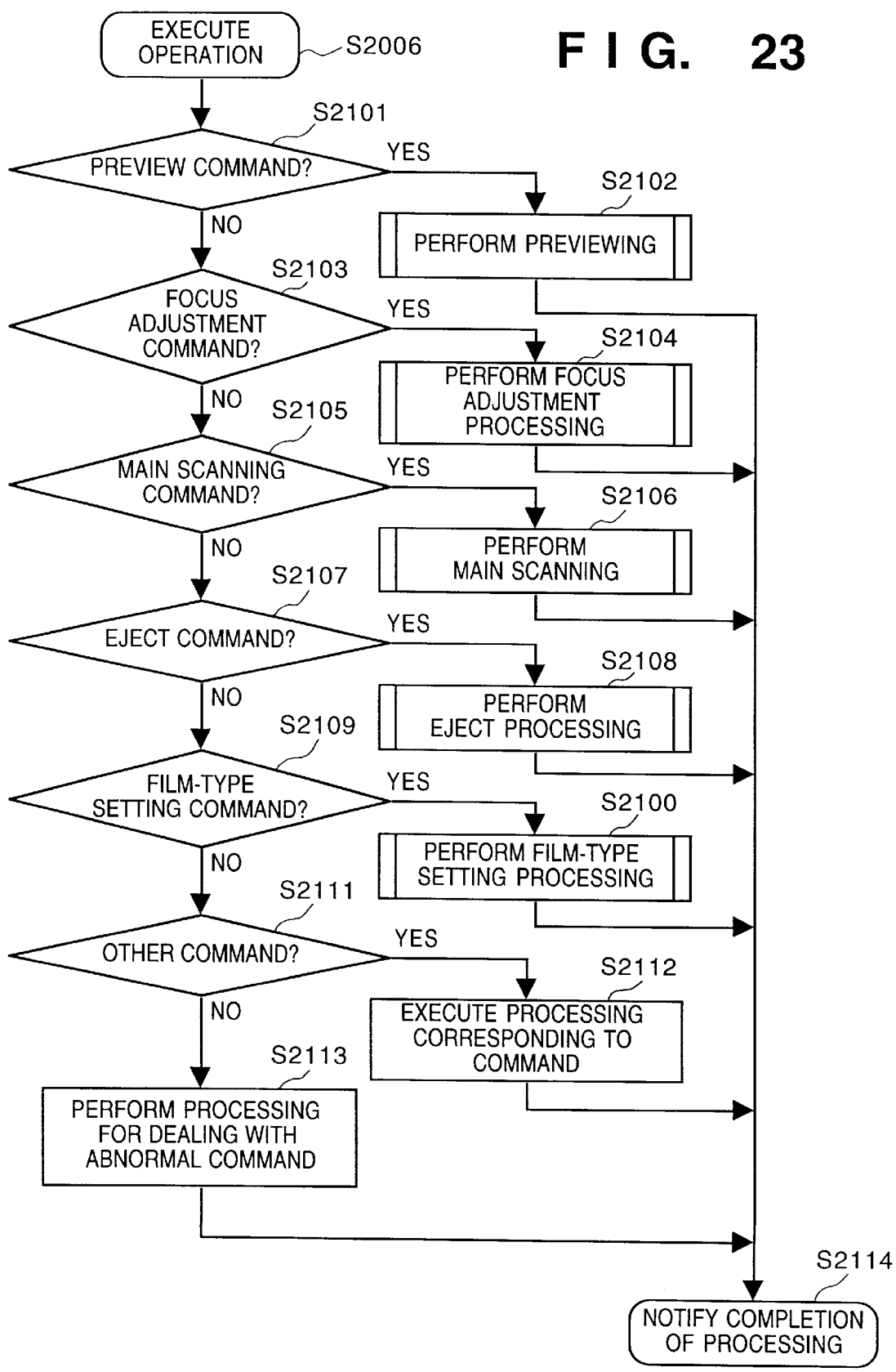
FIG. 23 is a flowchart showing a command execution routine performed in the flowchart shown in FIG. 21.

FIG. 23 is a flowchart showing a command execution routine performed in step S2006 in FIG. 21.

First in step S2101, whether an operation command sent from the external device 114 is a preview command or not is determined. If YES, after previewing (detail will be explained later) is performed in step S2102, completion of the previewing is informed to the external device 114 in step S2114, thereby the processing is completed. Whereas, if NO in step S2101, then the process proceeds to step S2103 where whether the transmitted command is a focus adjustment command or not is determined. If YES, then the process proceeds to step S2104 where focus adjustment processing (detail will be explained later) is performed, then the completion of the focus adjustment processing is informed to the external device 114 in step S2114, thereby completing the processing. Whereas, if NO in step S2103, then the process proceeds to step S2105 where whether the transmitted command is a main scanning command or not is judged. If YES, then the process proceeds to step S2106 where the main scanning (detail will be explained later) is performed, then the completion of the main scanning is informed to the external device 114 in step S2114, thereby completing the proceeding. Whereas, if NO in step S2105, then the process proceeds to step S2107 where whether the transmitted command is an eject command or not is determined. If YES, then the process proceeds to step S2108 where the eject processing (detail will be explained later) is performed, then the completion of the eject processing is informed to the external device 114 in step S2114, thereby completing the processing. Whereas, if NO in step S2107, then the process proceeds to step S2109 where whether the transmitted command is a film-type setting command or not is determined. If YES, then the process proceeds to step S2110 where the film-type setting processing (detail will be explained later) is performed, then the completion of the film-type setting processing is informed to the external device 114 in step S2114, thereby completing the processing. Whereas, if NO in step S2109, then the process proceeds to step S2111 where whether the transmitted command is other command or not is determined. If YES, then the process proceeds to step S2112 where processing corresponding to the command is performed, then the completion of the processing is informed to the external device 114 in step S2114, thereby completing the processing. Whereas, if NO in step S2111, then the process proceeds to step S2113 where it is determined that an abnormal command is inputted, and processing for dealing with the abnormal command is performed, then the completion of the processing is notified to the external device 114 in step S2114, thereby completing the processing.

Next, flows of each process shown in FIGS. 21 and 23 is explained below.

Figure 24:
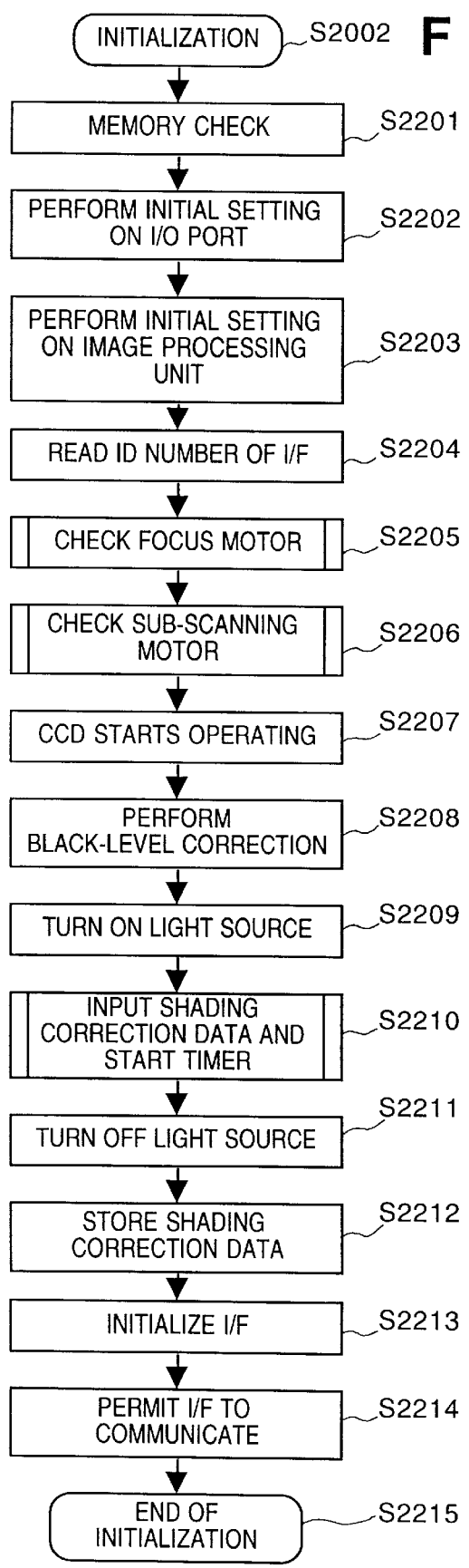
FIG. 24 is a flowchart showing initialization performed in the flowchart shown in FIG. 21.

FIG. 24 is a flowchart showing the initialization processed in step S2002 in FIG. 21.

First, in step S2201, memory check is performed on the line buffer 109 and the offset RAM 122, then in step S2202, initial settings are set for the input/output (I/O) port of the system controller 111. Further, in step S2203, the image processing unit 108 is initialized so as to be ready for image processing.

Next, after the system controller 111 reads an identification number of the I/F 110 in-step S2204, it drives the focus motor 123 to move the focal point fixing member 105 to a predetermined initial position (referred to as "focusing initial position", hereinafter) in step S2205. Note, the focus position detector 125 is also checked at this time.

Thereafter, the system controller 111 drives the sub-scanning motor 115 to move the film 102 to a start position for scanning in the sub-scanning direction (referred to as "sub-scanning initial position") in step S2206. Note, the sub-scanning position detector 117 is also checked at the same time.

Next, the system controller 111 permits the image processing unit 108 to output a clock signal 120 in step S2207, then controls to perform black-level correction by the black level correction circuit 106 in step S2208.

Then, the system controller 111 issues a light-source ON instruction to the light-source on/off circuit 118 in step S2209.

Thereafter, in step S2210, the system controller 111 sets shading correction data, and starts a timer 126 which is provided inside of the system controller 111 (timer for counting the elapsed time since shading correction data is set).

Subsequently, the system controller 111 issues a light-source OFF instruction to the light-source on/off circuit 118 in step 2211, and the shading correction data is stored in the offset RAM 122 in step S2212. Next, after the system controller 111 initializes the I/F 110 in step S2213, it permits the I/F 110 to communicate in step S2214. Accordingly, the initialization is completed in step S2215 and the process goes back to the routine shown in FIG. 21.

Next, processing performed in response to each command is explained.

Figure 25:
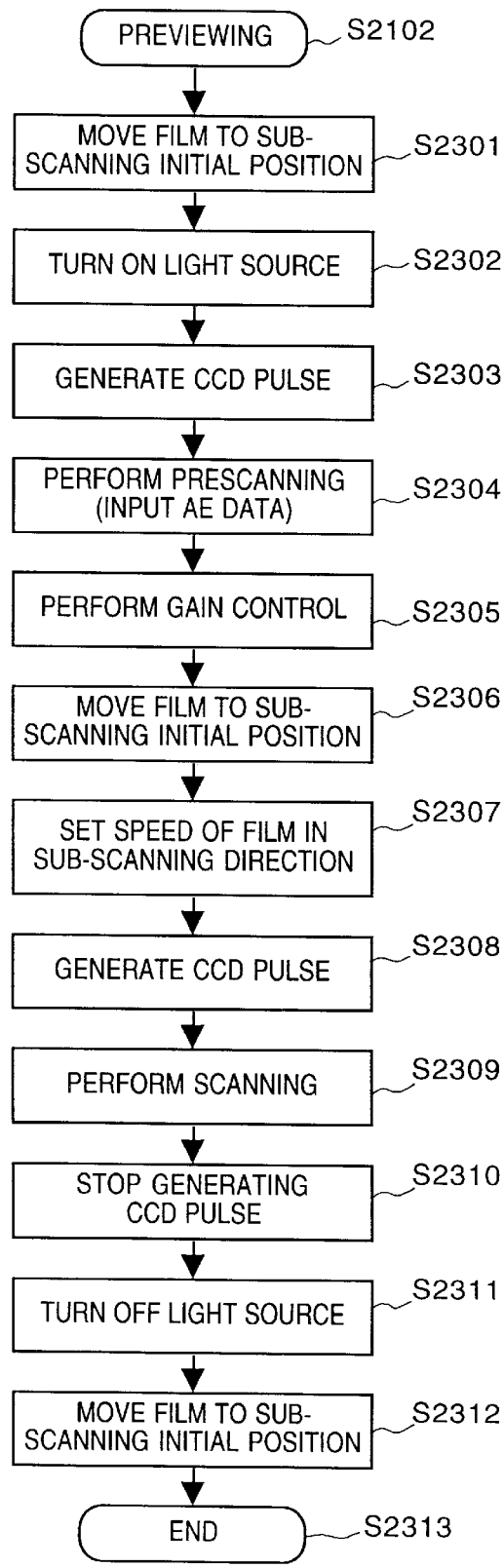
FIG. 25 is a flowchart showing a sequence of previewing performed in the flowchart shown in FIG. 23.

FIG. 25 is a flowchart showing a sequence of the previewing performed in step S2102 in FIG. 23.

First in step S2301, the system controller 111 supervises the state of the sub-scanning position detector 117, and controls the sub-scanning motor 115 so as to move the film 102 to the sub-scanning initial position.

The process proceeds to step S2302 and the system controller 111 issues the light source ON instruction to the light-source on/off circuit 118, and in the next step S2303, the system controller 111 permits the image processing unit 108 to generate the clock signal 120.

The process proceeds to step S2304, where pre-scanning is performed. In this step, the sub-scanning motor 115 moves the film 102 so that a central portion of the frame image is placed at the optical axis of the optical system 103, then data on the quantity of light (AE data) is obtained. Here, in the first embodiment, the CCD 104 is used as a quantity-of-light sensor, however, a separate sensor for exclusive use of measuring the quantity of light may be provided to measure the quantity of light.

Next, the process proceeds to step S2305 where gain adjustment is performed on the basis of the input quantity-of-light data. More specifically, when the quantity of light is low, the gain is increased, whereas, when the quantity of light is too high, the gain is decreased, thereby adjusting the gain.

In the proceeding step S2306, the sub-scanning motor 115 moves the film 102 to the sub-scanning initial position, and in step S2307, the speed to scan the film 102 in the sub-scanning direction for the previewing is set.

Thereafter, a resolution used in the previewing is set, and the clock signal 120 is outputted. Next in step S2309, a signal processing area in the previewing is set to the image processing unit 108 and scanning of the film starts.

Then, after the clock signal 120 is stopped in step S2310, in step S2311, the system controller 111 issues the light source OFF instruction to the light-source on/off circuit 118. Then the process proceeds to step S2312 where the position of the film 102 which is moved in the scanning in step S2309 is returned to the sub-scanning initial position, then the processing is completed.

Then, the previewing is completed in step S2313.

Figure 26:
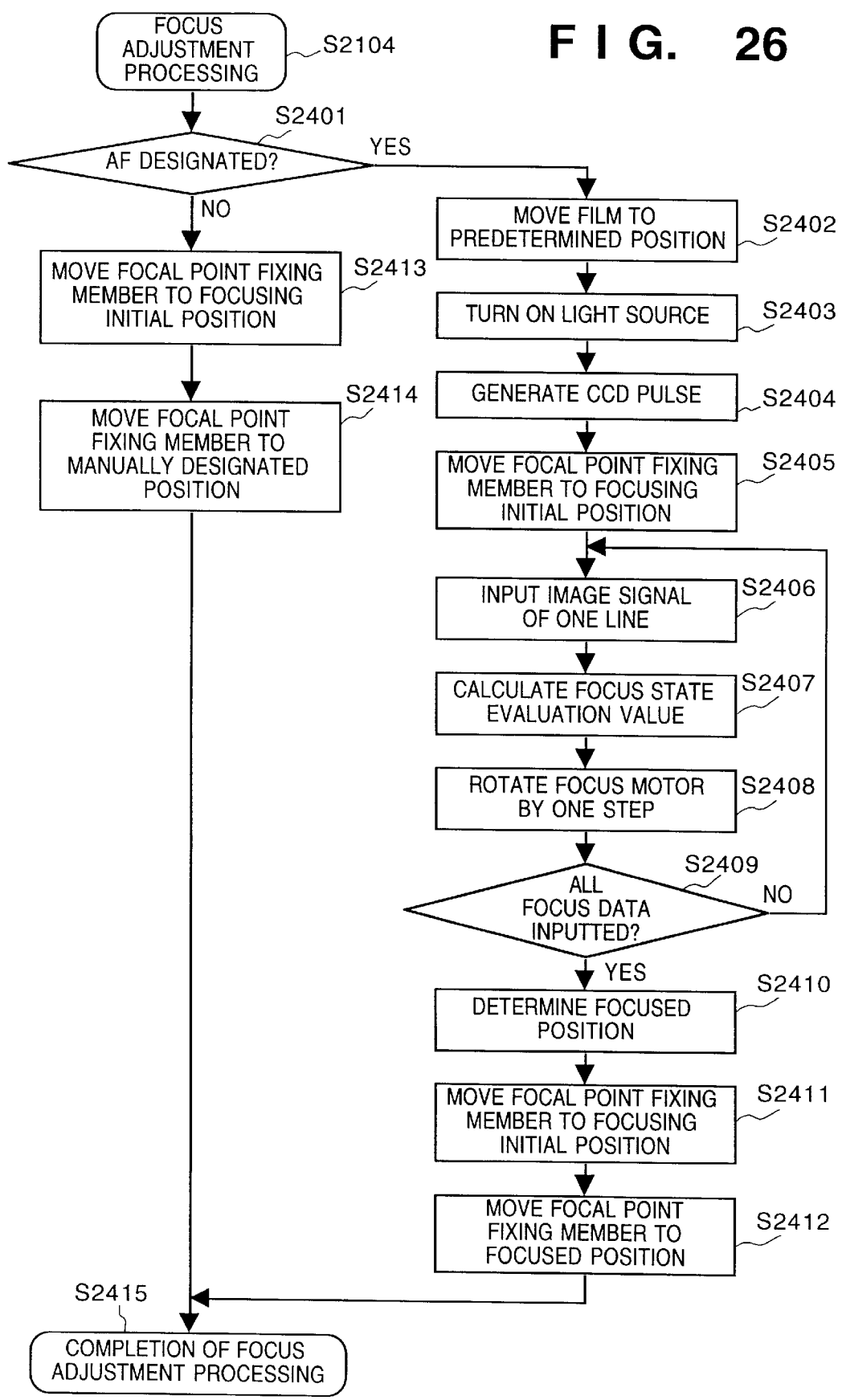
FIG. 26 is a flowchart showing a sequence of focus adjustment processing performed in the flowchart shown in FIG. 23.

FIG. 26 is a flowchart showing a sequence of the focus adjustment processing performed in step S2104 in FIG. 23.

In step S2401, whether or not a designation for performing automatic focusing (abbreviated as "AF" hereinafter) operation is included in the focus adjustment command is determined. If YES, then the process proceeds to step S2402, whereas if NO, then the process proceeds to step S2413.

In step S2402, the sub-scanning motor 115 is operated to move the film 102 from the sub-scanning initial position to a predetermined position where the focusing processing is performed (when focusing on the center of a frame image, for example, to the position where the optical axis of the optical system 103 intersects the center of the frame image). Next, in step S2403, the system controller 111 issues the light-source ON instruction to the light-source on/off circuit 118. The process proceeds to step S2404 where the system controller 111 issues an instruction to the resolution/magnification converter 205 so as to read an image in the same resolution as that of the CCD 104 and to generate the clock signal 120.

Thereafter, in step S2405, the focus motor 123 is controlled so that the focal point fixing member 105 is moved to the focusing initial position. Then, the process proceeds to step S2406 where an image signal of a single line is inputted. This input image signal is temporally stored in the offset RAM 122.

Next in step S2407, a focus state evaluation value is calculated. As the focus state evaluation value, the degree of sharpness is calculated, and it is stored in the offset RAM 122 along with the position of the focal point fixing member 105. Note, the degree of sharpness is a sum-square of the difference between outputs of two adjoining pixels, and it is calculated by using a known method.

Next in step S2408, the focus motor 123 is rotated by one step to move the focal point fixing member 105. In the proceeding step S2409, whether or not all focus data, i.e., the focus state evaluation values and the accompanying positions of the focal point fixing member 105, in a focusing area is inputted is determined. If NO, then the process returns to step S2406, whereas, if YES, the process proceeds to step S2410 where a focused position is determined on the basis of the focus state evaluation values. More specifically, among the focus state evaluation values, the position where the maximum degree of sharpness is obtained is determined as the focused position.

Then, in step S2411, the focus motor 123 is controlled to move the focal point fixing member 105 to the focusing initial position, and in step S2412, the focus motor 123 is further controlled to move the focal point fixing member 105 to the focused position.

Whereas, if NO in step S2401, namely, if no automatic focusing is designated in the focus adjustment command, the process proceeds to step S2413 where the focus motor 123 is controlled to move the focal point fixing member 105 to the focusing initial position. Thereafter, in step S2414, the focus motor 123 is moved to a position where is manually designated by the user, then the process proceeds to step S2415 where the sub-scanning motor 115 moves the film 102 to the sub-scanning initial position, and the processing is completed.

Figure 27:
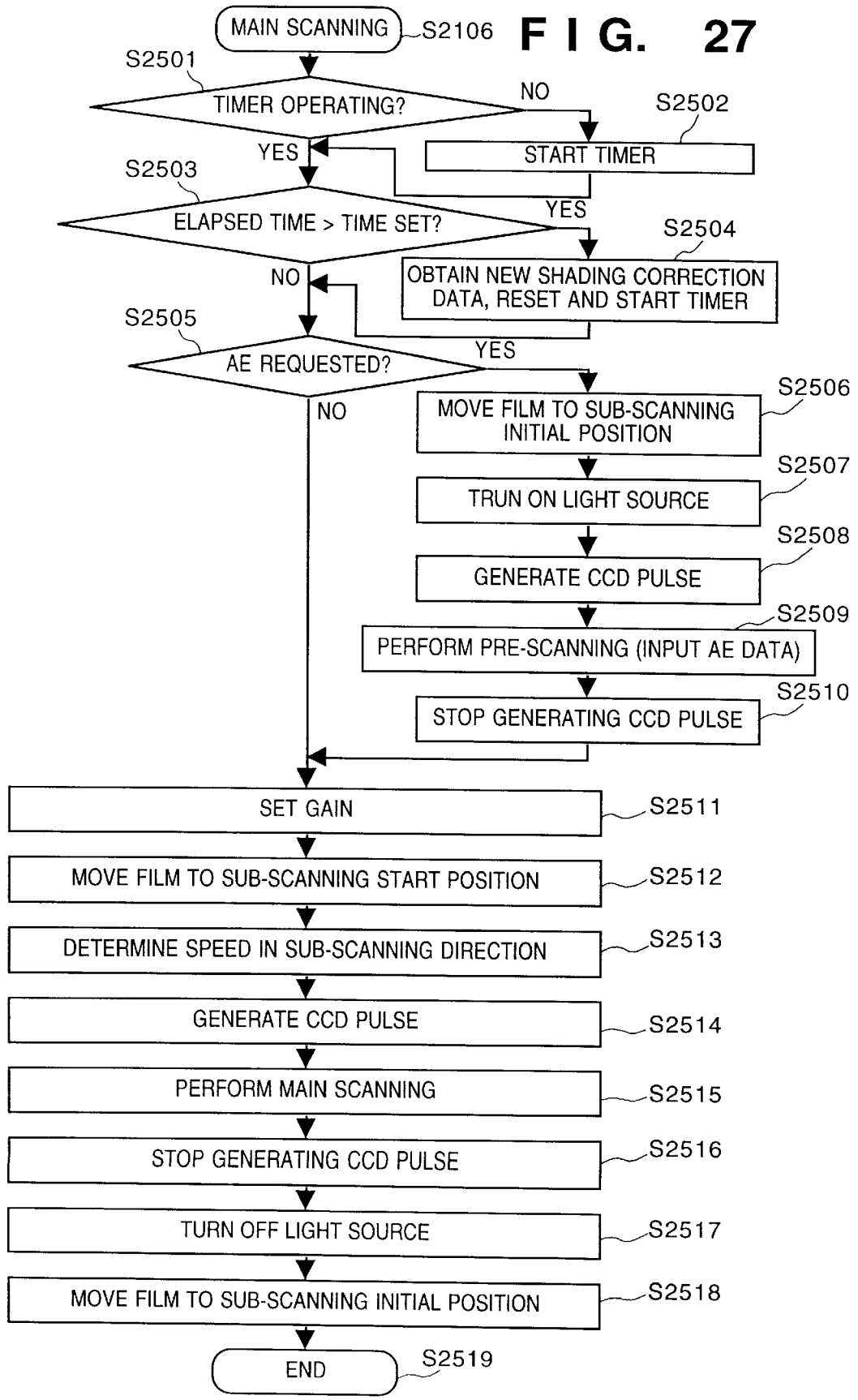
FIG. 27 is a flowchart showing a sequence of main scanning performed in the flowchart shown in FIG. 23.

FIG. 27 is a flowchart showing a sequence of the main scanning performed in step S2106 in FIG. 23.

When the main scanning command is received, whether or not the timer 126 is operating is checked in step S2501. If YES in step S2501, the process goes to step S2503. Whereas, if the timer is not operating (NO in step S2501), then the process proceeds to step S2502 where the timer 126 is started, then proceeds to step S2503.

In step S2503, elapsed time which is counted by the timer 126 is compared to a predetermined period of time. The period of time can be arbitrarily determined in dependence upon how precise shading correction is to be performed. For example, in order to increase the precision of the shading correction, the period of time may be set short, whereas in order to save time for updating shading correction data although the precision of the shading correction is somewhat deteriorated, the time may be set long. If the elapsed time is within the predetermined time (NO in step S2503), then the process proceeds to step S2505. Whereas, if the elapsed time is equal or longer than the predetermined period of time (YES in step S2503), then the process proceeds to step S2504 where new shading correction data is obtained and set. Further, the timer 126 is reset and started.

In order to obtain the new shading correction data in step S2504, the film 102 is withdrawn from the optical axis of the optical system 103. If the film is an APS™ film, for example, the film is rewound into the cartridge. Thereafter, the new shading correction data is obtained, and the film is placed back at the former position. In a case of the APS™ film, the film is pulled out from the cartridge to the position where the film was before rewinding.

Note, the shading correction data may be obtained by repeating the initialization processing which is executed in step S2002. Further, before taking new shading correction data, a message informing the user of taking new shading correction data may be displayed, or a message for advising the user to input an instruction for taking new shading correction data may be displayed so that the operation for taking the new shading correction data is performed after the user instructed to do so. In any case, the timer 126 is reset only when the shading correction data is taken and set.

Next, in step S2505, whether or not a command for requesting the automatic exposure (AE) processing is included in the main scanning command is determined. If NO, then the process directly moves to step S2511, whereas if YES, then the process proceeds to step S2506 where the system controller 111 controls the sub-scanning motor 115 to move the film 102 to the sub-scanning initial position.

Then, in step S2507, the light source ON instruction is issued to the light-source on/off circuit 118. The process proceeds to step S2508 where the system controller 111 instructs the resolution/magnification converter 205 to generate a driving pulse for measuring the quantity of light, thereby permits the resolution/magnification converter 205 to generate the clock signal 120.

Next in step S2509, pre-scanning is performed, and a value of the density of an image recorded on the-film is estimated on the basis of the measured quantity of light, then the value of gain is calculated.

In step S2510, the clock signal 120 is stopped, and the process proceeds to step S2511. In step S2511, the value of the gain is set.

Next, in step S2512, the system controller 111 controls the sub-scanning motor 115 to move the film 102 to a sub-scanning start position, where sub-scanning is started designated by, e.g., trimming information which indicates the size and shape of an image to be outputted. Next, in step S2513, the speed of sub scanning motor 115 is set in accordance with the resolution designated in the main scanning command. Thereafter, in step S2514, settings for generating the CCD pulse in the main scanning direction are set in the resolution/magnification converter 205 on the basis of the resolution designated in the main scanning command, in turn, the resolution/magnification converter 205 generates the clock signal 120.

Next in step S2515, the scanning range in the sub-scanning direction and the range of the image to be processed with image processes in the main scanning direction are determined in accordance with the designation included in the main scanning command, and the main scanning is performed.

Next in step S2516, generation of the clock signal 120 is stopped, and in the proceeding step S2517, the system controller 111 issues the light source OFF instruction to the light-source on/off circuit 118. Further in step S2518, the position of the film 102 is moved to the sub-scanning initial position while checking the sub-scanning position detector 117, thereby completing the main scanning in step S2519.

Figure 28:
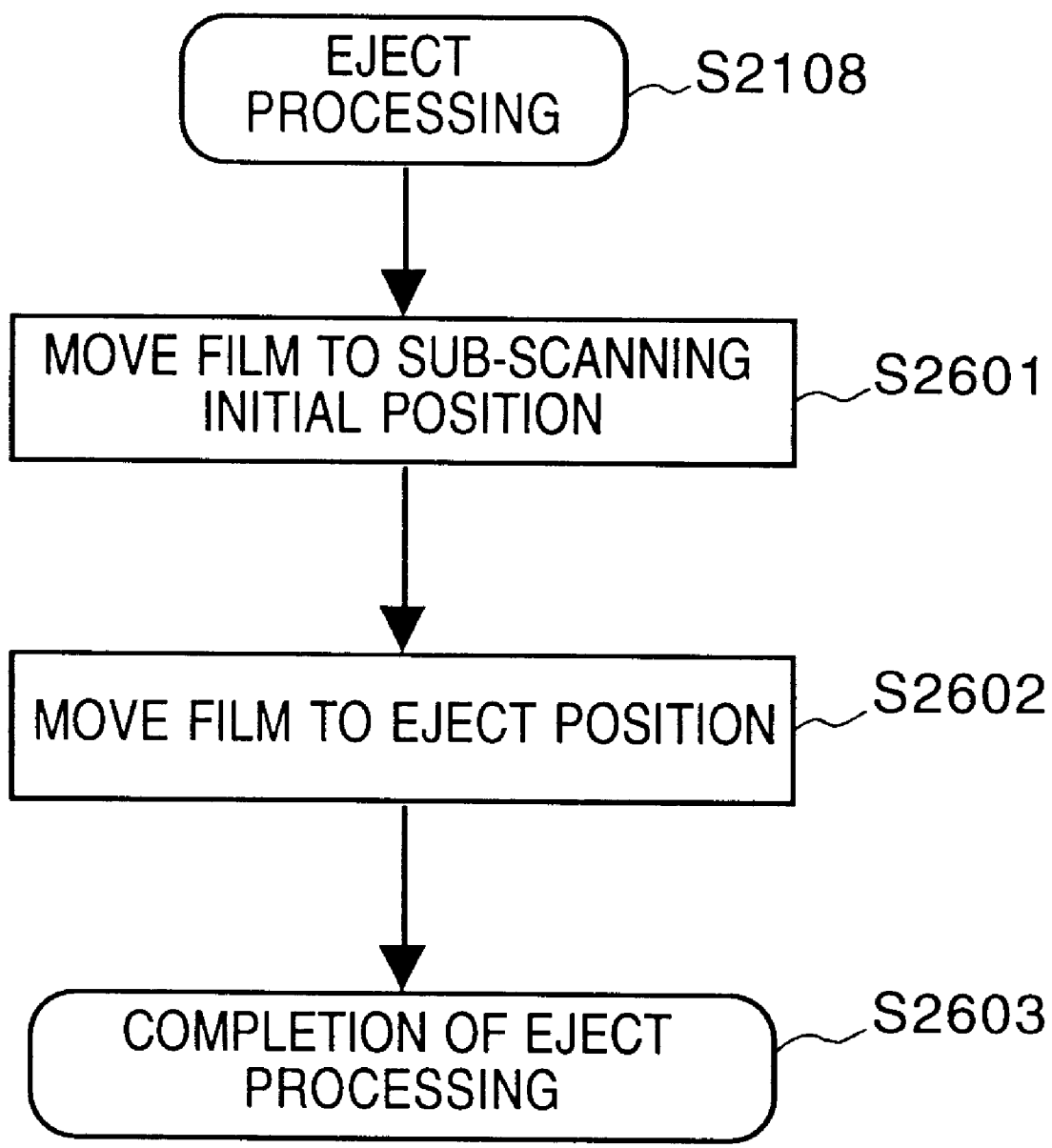
FIG. 28 is a flowchart showing a sequence of eject processing performed in the flowchart shown in FIG. 23.

FIG. 28 is a flowchart showing a sequence of the eject processing performed in step S2108 in FIG. 23.

In step S2601, the system controller 111 controls the sub-scanning motor 115 to move the film 102 to the sub-scanning initial position while supervising the sub-scanning position detector 117. In the proceeding step S2602, the film 102 is moved toward outside of the film scanner 1 from the sub-scanning initial position by a predetermined number of pulses to a predetermined eject position, thereafter in step S2603, the eject processing is completed by turning off the electric power to the sub-scanning motor 115.

Figure 29:
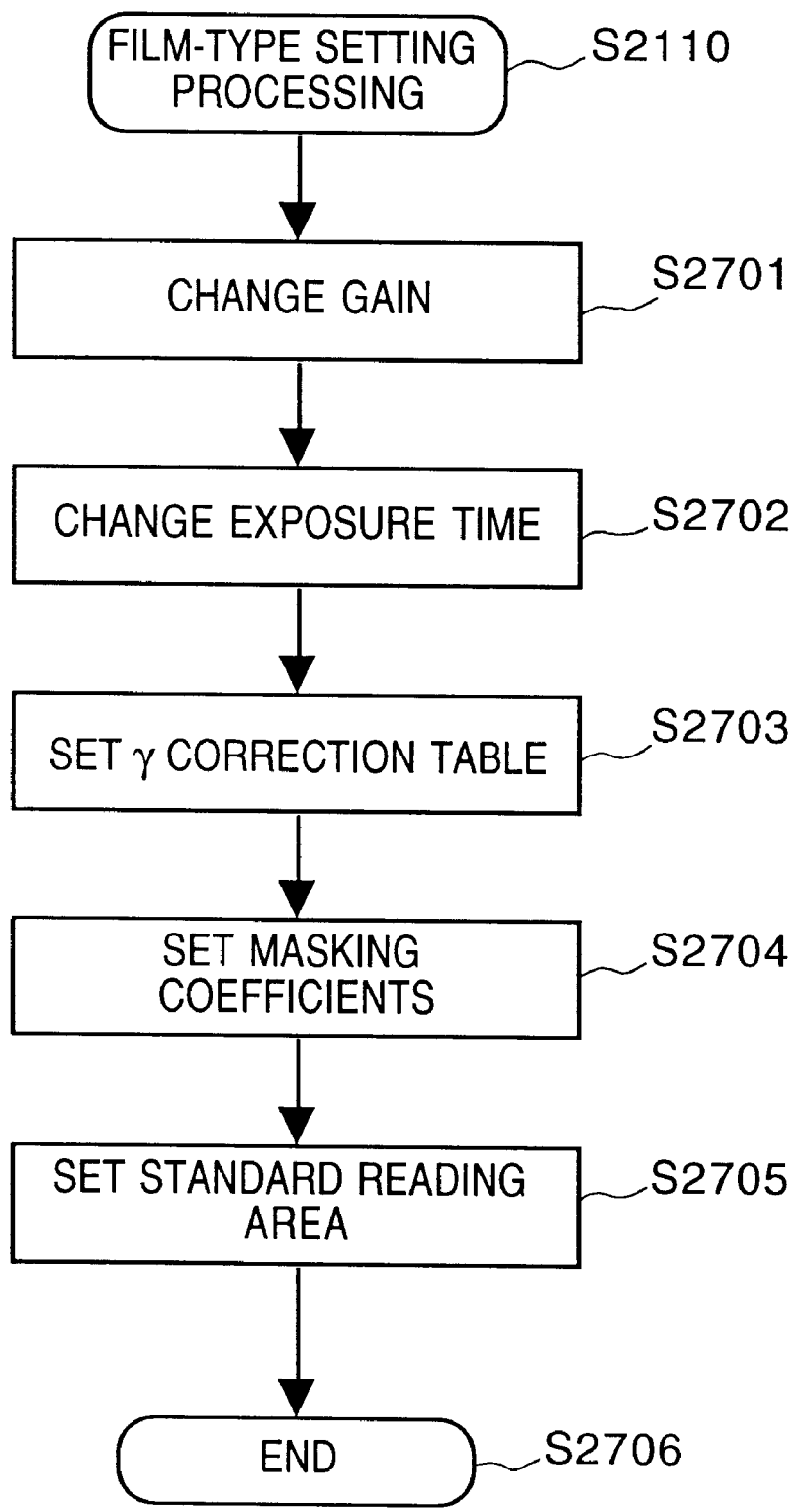
FIG. 29 is a flowchart showing a sequence of film-type setting processing in the flowchart shown in FIG. 23.
Figure 30:
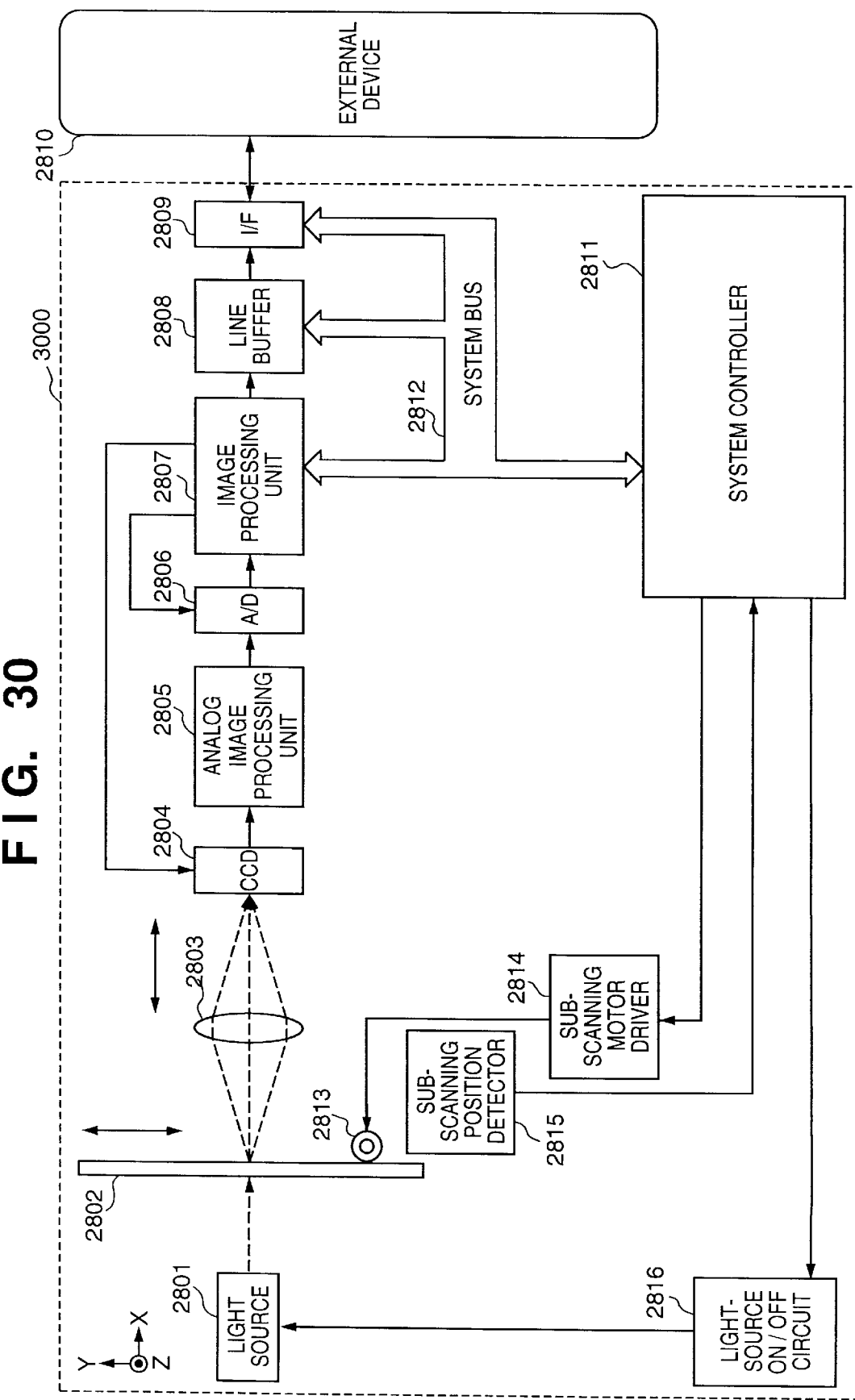
FIG. 30 is a block diagram illustrating a configuration of a conventional film scanner capable of reading an image recorded on an APS™ film.
Figure 31:
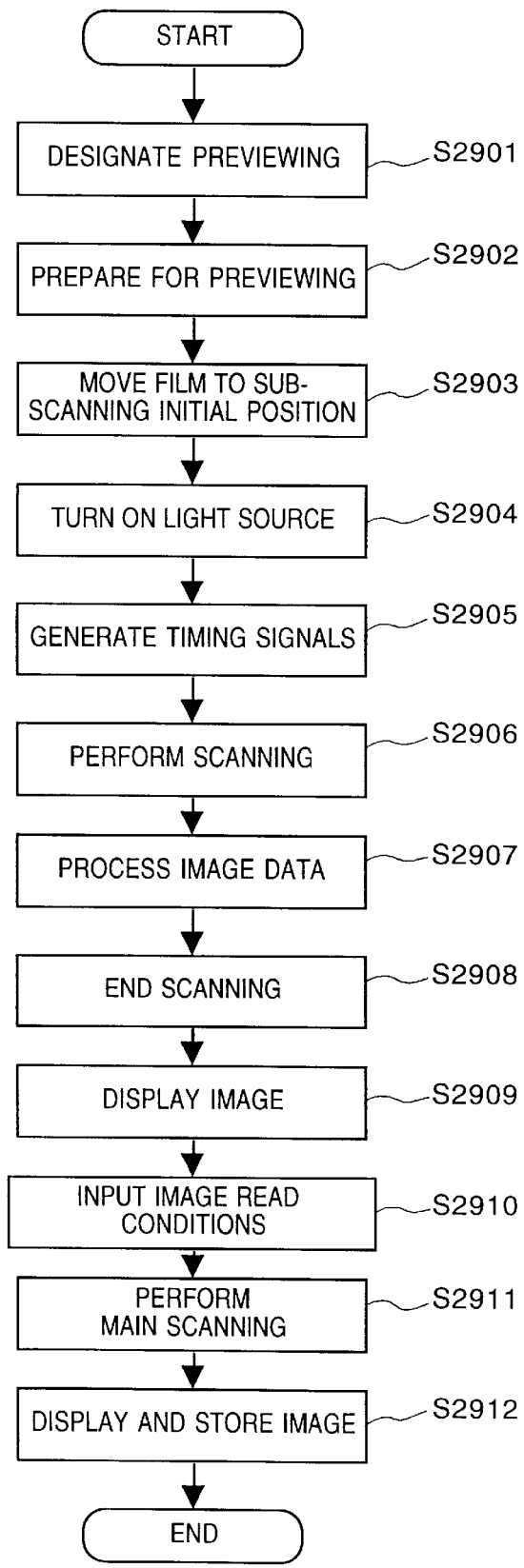
FIG. 31 is a flowchart showing an operational sequence of the conventional film scanner and the external device.

FIG. 29 is a flowchart showing a sequence of the film-type setting processing performed in step S2110 in FIG. 23.

Referring to FIG. 29, in step S2701, the film type is set to either a negative film or a positive film and, when negative film is set, parameters are set depending upon the color of the film base which differs from one film to another. After the setting for a 35 mm film or an APS™ film is performed, then the gain in the amplifier is changed in accordance with the above settings.

In step S2702, an exposure period of time is changed in dependence upon the setting of either the negative film or the positive film. At this time, the exposure period of time is also changed in correspondence to transparency of the negative film, if necessary.

In step S2703, a γ correction table suitable for the film type designated in step S2701 is stored in the offset RAM 122. Further, in proceeding step S2704, a masking coefficients suitable for the film type selected in step S2701 is set.

Then, in step S2705, a standard reading area is set in a case where a 135 (35 mm) film is set. Whereas, if an APS™ film is set, image sensing mode is read from magnetic information recorded on the film by the magnetic information detector 119. When a user takes a photograph using the APS™ film, the user can select one of the following image sensing modes which designate three different print sizes. These modes represent frame sizes of:

16.7 mm×30.2 mm (a)

9.5 mm×30.2 mm (b)

16.7 mm×23.4 mm (c)

on the film. All images recorded on the film have the size (a), and one of the image sensing modes is recorded along with each image as magnetic information. In accordance with the recorded image sensing mode, start position for scanning the image is changed individually. Until the start position, the film can be fed at high speed in the sub-scanning direction, thereby it is possible to shorten a period of time needed for performing scanning operation. More specifically, in the mode (c), the size of the image to be printed is 6.8 mm shorter in the sub-scanning direction than in the modes (a) and (b), and the film can be fed at high speed during the 6.8 mm portion.

Further, the width (in the main scanning direction) of the APS™ film is narrower than a 135 (35 mm) film, therefore, the output signals from the CCD 104 include signals which do not represents image information. Therefore, by performing signal processes so as not to process the signals which do not represents image information, the processing time is shortened, as well as it becomes unnecessary to perform trimming.

Then, in step S2706, the film-type setting processing is completed.

According to the first embodiment as described above, it is possible to reduce deterioration due to shading which changes as time elapses.

<Second Embodiment>

In the first embodiment, timing for taking new shading correction data is determined in the film scanner 1, however, it is possible to determine in the external device 114, such as a host computer.

Figure 32:
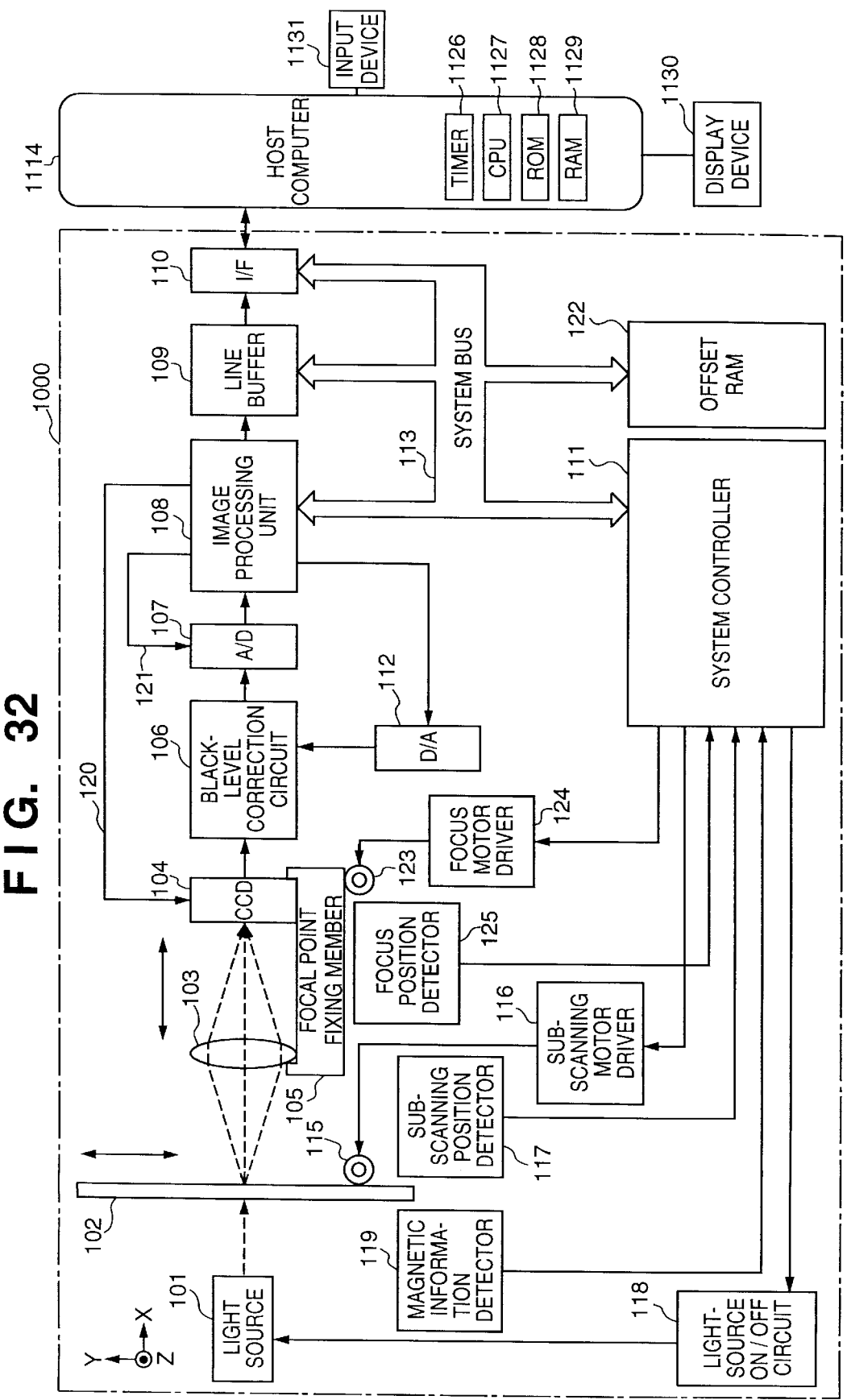
FIG. 32 is a view showing an overall configuration of an image read system according to a second embodiment of the present invention.

FIG. 32 is a block diagram illustrating an image read system according to a second embodiment of the present invention. In FIG. 32, the same units and elements as those in FIG. 1 are referred by the same reference numerals, and explanation of them is omitted.

Differing from the first embodiment, the timer 1126 is provided in an external device, such as a host computer, 1114 having CPU 1127, ROM 1128 and RAM 1129, as shown in FIG. 32, and the timer 1126 is checked by the CPU 1127. Further, reference numeral 1130 denotes a display device connected to the host computer 1114; and 1131, an input device, such as keyboard and mouse.

The detailed configuration of the film scanner 1000 other than the timer, and communication processing and command processing other than processes relating to the timer are the same as those explained in the first embodiment, therefore, the explanation of those is omitted.

Note, the processes relating to the timer in the first embodiment are that a process for starting the timer 126 in step S2210 in FIG. 24, the determination in step S2501 in FIG. 27, a process for starting the timer 126 in step S2502 in FIG. 27, and a process for resetting and starting the timer 126 in step S2504 in FIG. 27. These processes are not performed in the film scanner 1000 in the second embodiment.

Figure 33:
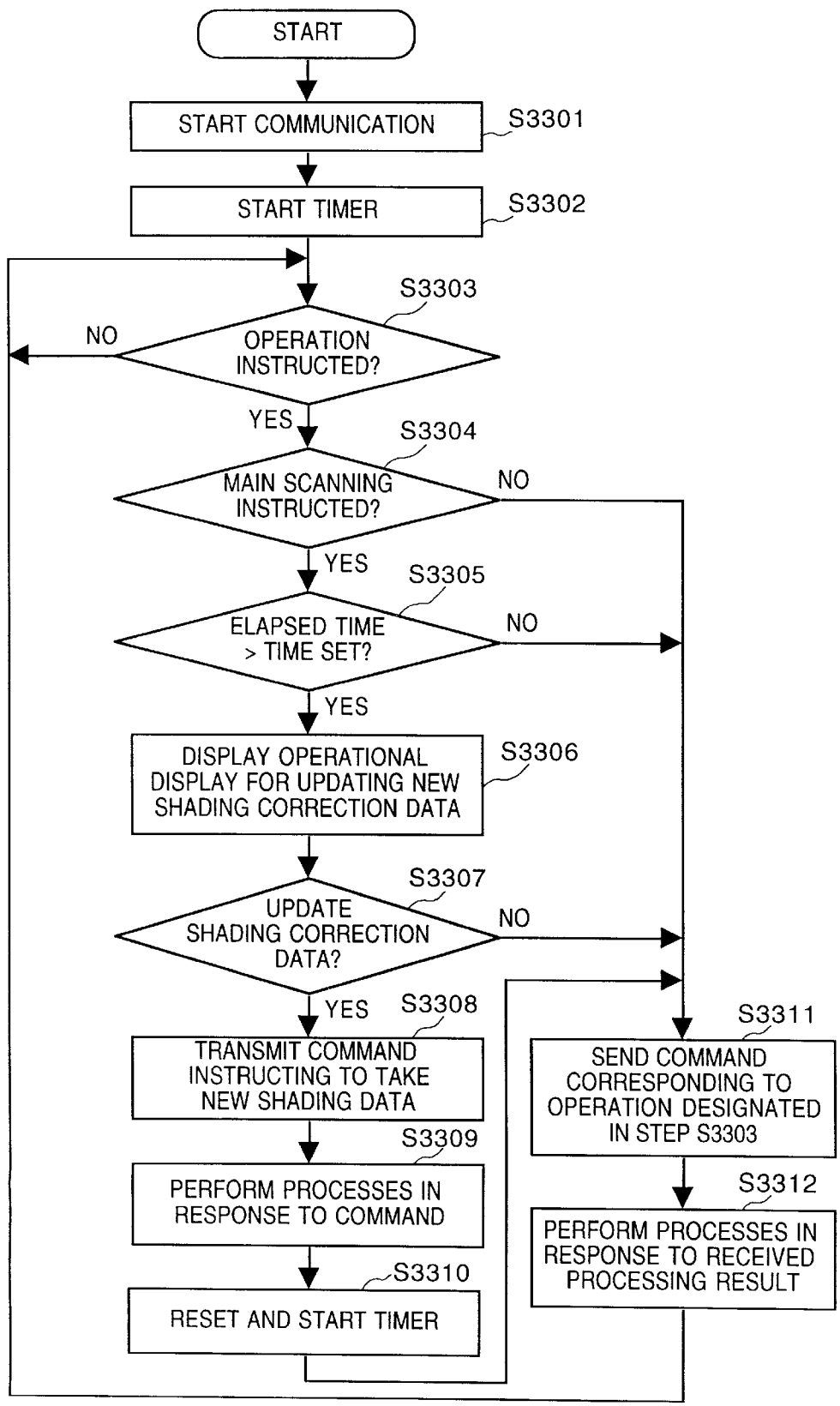
FIG. 33 is a flowchart showing an operation in an external device according to the second embodiment of the present invention.

FIG. 33 is a flowchart of processing performed by the host computer 1114 having the configuration as shown in FIG. 32.

First, when communication between the host computer 1114 and the film scanner 1000 is established in step S3301, then, in step S3302, the timer 1126 is started. Note, step S3301 corresponds to step S2009 in FIG. 22. Thus, the processes subsequent to step S3302 in FIG. 33 corresponds to detailed explanation of step S2011 and its subsequent processes shown in FIG. 22.

After the timer 1126 is started in step S3302, the process proceeds to step S3303 where whether or not operation is designated by a user through the input device 1131 is determined. When the operation is designated (YES in step S3303), the process proceeds to step S3304 where whether or not main scanning is designated or not is determined. If it is determined that operation other then main scanning is designated (NO in step S3304), then the process proceeds to step S3311 (corresponds to step S2012 in FIG. 22) where a command of the designated operation is transmitted to the film scanner 1000. After the host computer 1114 is informed of completion of processing corresponding to the transmitted command in step S3312 (corresponds to step S2013 in FIG. 22), the process returns to step S3303 and waits for the next instruction.

If it is determined that main scanning is designated in step S3304, then the process proceeds to step S3305 where whether or not the elapsed time determined by the timer 1126 has passed a predetermined period of time. If not, then the process proceeds to step S3311 where a main scanning command is transmitted to the film scanner 1000, and after the completion of the main scanning, indicated by the film scanner 1000 in step S3312, the process returns to step S3303 and waits for the next instruction.

When it is determined that the elapsed time has passed the predetermined period of time in step S3305, then the process proceeds to step S3306 where an operational display for receiving instruction to designate whether or not to update shading correction data is displayed on the display device 1130, then the process proceeds to step S3307. When an instruction not to update the shading correction data is inputted in step S3307, then the process proceeds to step S3311 where a main scanning command is transmitted to the film scanner 1000, and after the completion of the main scanning is indicated by the film scanner 1000 in step S3312, then the process returns to step S3303 and waits for the next designation.

If an instruction to update shading correction data is inputted in step S3307 (YES in step S3307), the process proceeds to step S3308 where a command for taking new shading correction data is transmitted to the film scanner 1000 (corresponds to step S2012 in FIG. 22). Then, after the completion of taking of new shading correction is indicated by the film scanner 1000 in step S3309, the process proceeds to step S3310 where the timer 1126 is reset and started. Then, the process proceeds to step S3311 where a main scanning command is transmitted to the film scanner 1000, and after the completion of the main scanning is indicated by the film scanner 1000 in step S3312, then the process returns to step S3303 and waits for the next designation.

According to the second embodiment as described above, it is possible to reduce deterioration due to shading which changed as time elapses, similarly to the first embodiment.

In the aforesaid first and second embodiments, the shading correction data is updated while performing main scanning so that read image data can be performed with optimized shading correction, however, the time for updating the shading correction data is not limited to this. For example, it is possible to update the shading correction data during the performing of previewing and/or while waiting for any instruction to be designated.

<Other Embodiment>

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the second embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above second embodiment are realized by executing the program codes which are read by a computer, the present invention includes a case where an OS (operating system) or the like working on the computer performs a part or entire processes in accordance with designations of the program codes and realizes functions according to the above second embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above second embodiment.

The present invention is not limited to the above second embodiment and various changes and modifications can be made within the spirit and scope of the present invention. Therefore to appraise the public of the scope of the present invention, the following claims are made.

What is claimed is:

1. An image read method, comprising:
   an image read step of reading an image from a recording medium and outputting image data;
   a setting step of setting shading correction data;
   a time counting step of counting elapsed time from a predetermined time;
   a display step of displaying a predetermined operational display for updating shading correction data when the elapsed time counted in said time counting step is longer than a predetermined period of time;
   an updating step of updating the shading correction data in response to a manual operation performed in accordance with the predetermined operational display; and
   an image processing step of performing image process on the image data obtained in said image read step using the shading correction data.

2. The image read method according to claim 1, wherein the predetermined time includes a time when the shading correction data is set in said setting step and in said updating step.

3. The image read method according to claim 1, wherein the predetermined time includes a time when reading operation of the image is started in said image read step.

4. The image read method according to claim 1, wherein said updating step comprises a step of withdrawing the recording medium from an optical axis of an optical system and a step of repeating said setting step.

5. The image read method according to claim 1, wherein the recording medium is an advanced photo system™ film, and said updating step comprises a step of rewinding the film, a step of repeating said setting step, and a step of pulling out the film to the position where the film was before rewinding, after updating the shading correction data.

6. The image read method according to claim 1, wherein said setting step is performed during initialization of an image read apparatus, and said updating step performs the initialization.

7. The control method according to claim 1, wherein the predetermined time includes a time when communication is started.

8. The information processing apparatus according to claim 1, wherein the predetermined time includes a time when communication with the image read apparatus is started.

9. An image read apparatus, comprising:
   image read means for reading an image from a recording medium and outputting image data;
   setting means for setting shading correction data;
   storage means for storing the shading correction data set by said setting means;
   time counting means for counting elapsed time from a predetermined time;
   display means for displaying a predetermined operational display for updating shading correction data when the elapsed time counted by said time counting means is longer than a predetermined period of time;
   control means for controlling said setting means to update the shading correction data in response to a manual operation performed in accordance with the predetermined operational display; and
   image processing means for performing image process on the image data obtained by said image read means using the shading correction data stored in said storage means.

10. The image read apparatus according to claim 9, wherein the predetermined time includes a time when the shading correction data is set by said setting means.

11. The image read apparatus according to claim 9, wherein the predetermined time includes a time when reading operation of image data by said image read means is started.

12. The image read apparatus according to claim 9 further comprising withdrawing means for withdrawing the recording medium from an optical axis of an optical system and replacing means for replacing the recording medium to the position where the recording medium was before withdrawing, wherein said control means controls said withdrawing means to withdraw the recording medium from the optical axis before updating the shading correction data performed by said setting means, and controls said replacing means for replacing the recording medium back to the position where the recording medium was before withdrawing after finishing updating of the shading correction data.

13. The image read apparatus according to claim 9, wherein the recording medium is an advanced photo system™ film, and the image read apparatus further comprises rewinding means for rewinding the film, and pulling-out means for pulling out the film to the position where the film was before rewinding, wherein said control means controls said rewinding means to rewind the film before updating the shading correction data performed by said setting means, and controls said pulling out means to pull the film out to the position where the film was before rewinding after finishing updating of the shading correction data.

14. The image read apparatus according to claim 9, wherein the shading correction data is set during initialization of an image read apparatus by said setting means, and said control means controls to perform the initialization to update the shading correction data.

15. A control method for controlling an image read apparatus, comprising:

a time counting step of counting elapsed time from a predetermined time;

a display step of displaying a predetermined operational display for updating shading correction data when the elapsed time counted in said time counting step is longer than a predetermined period of time; and a designating step of designating to update shading correction data in response to a manual operation performed in accordance with the predetermined operational display.

16. The control method according to claim 15, wherein the predetermined time includes a time when updating of the shading correction data is designated in said designating step.

17. A control method for controlling an image read apparatus, comprising;

a time counting step of counting elapsed time from a predetermined time;

a determination step of determining whether or not updating of shading correction data is to be performed when the elapsed time counted in said time counting step is longer than a predetermined period of time;

a display step of displaying a predetermined operational display for updating shading correction data when it is determined in said determination step to perform updating of the shading correction data; and a designating step of designating to update the shading correction data to the image read apparatus in response to a manual operation performed in accordance with the predetermined operational display.

18. An information processing apparatus for controlling an image read apparatus, comprising:

time counting means for counting elapsed time from a predetermined time;

display means for displaying a predetermined operational display for updating shading correction data when the elapsed time counted by said time counting means is longer than a predetermined period of time; and designating means for designating to the image read apparatus to update shading correction data in response to a manual operation performed in accordance with the predetermined operational display.

19. The information processing apparatus according to claim 18, wherein the predetermined time includes a time when updating of the shading correction data is designated by said designating means.

20. An information processing apparatus for controlling an image read apparatus, comprising:

time counting means for counting elapsed time from a predetermined time;

determination means for determining whether or not updating of shading correction data is to be performed when the elapsed time counted by said time counting means is longer than a predetermined period of time;

display means for displaying a predetermined operational display for updating shading correction data when it is determined by said determination means to perform updating of the shading correction data; and designating means for designating to the image read apparatus to update the shading correction data in response to a manual operation performed in accordance with the predetermined operational display.

* * * * *

UNITED STATES PATENT AND TRADEMARK OFFICE
CERTIFICATE OF CORRECTION

PATENT NO. : 6,289,134 B1
DATED : September 11, 2001
INVENTOR(S) : Kazuyuki Kondo et al.

It is certified that error appears in the above-identified patent and that said Letters Patent is hereby corrected as shown below:

Column 1,
Line 62, "ifor" should read -- for --

Column 8,
Line 66, adirection," should read -- direction, --

Column 13,
Line 29, "in-step" should read -- in step --

Signed and Sealed this

Eleventh Day of June, 2002

Attest:

JAMES E. ROGAN
Attesting Officer     Director of the United States Patent and Trademark Office